US012226808B2

(12) United States Patent
Smiley et al.

(10) Patent No.: US 12,226,808 B2
(45) Date of Patent: Feb. 18, 2025

(54) AUTOMATIC SPRAYING MECHANISM FOR CLEANING AIR INLET LOUVERS OF COOLING TOWERS

(71) Applicant: SAUDI ARABIAN OIL COMPANY, Dhahran (SA)

(72) Inventors: Kal M. Smiley, Dhahran (SA); Farooq N. Jwesm, Dammam (SA); Abdullah A. Fuwaires, Dammam (SA); Turki A. Zahrani, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/190,744

(22) Filed: Mar. 27, 2023

(65) Prior Publication Data

US 2024/0326100 A1 Oct. 3, 2024

(51) Int. Cl.
*B08B 3/02* (2006.01)

(52) U.S. Cl.
CPC ........ *B08B 3/024* (2013.01); *B08B 2203/027* (2013.01)

(58) Field of Classification Search
CPC ........................................................ B08B 3/024
See application file for complete search history.

(56) References Cited

U.S. PATENT DOCUMENTS 4,509,544 A * 4/1985 Mains, Jr. ............... B08B 9/021 134/152
2015/0225891 A1* 8/2015 Clowes ................ C11D 3/3947 134/1
2022/0080577 A1* 3/2022 Tadayon ................. F24S 40/20

FOREIGN PATENT DOCUMENTS

KR 2019084144 A * 7/2019 ............ A47C 31/00

OTHER PUBLICATIONS

"Clean Air Inlet Louvers", Evapco, Mar. 26, 2023; pp. 1-5; Retrieved from the Internet: URL: https://www.evapco.com/faq/answer/clean-air-inlet-louvers (5 pages).
"Air Inlet Louvers for Cooling Towers", Filling Technologies; Mar. 26, 2023; pp. 1-5; Retrieved from the Internet: URL: https://fillingtechnologies.com/air-inlet-louvers (5 pages).
"Air Inlet Louver—An Important Role in Cooling Tower", Sep. 10, 2020; pp. 1-2; Retrieved from the Internet: URL: https://www.coolingtowerinfill.com/news/air-inlet-louver-role-cooling.html (2 pages).
(Continued)

*Primary Examiner* — Michael E Barr
*Assistant Examiner* — Kevin G Lee
(74) *Attorney, Agent, or Firm* — Osha Bergman Watanabe & Burton LLP

(57) ABSTRACT

A system includes a spray head comprising a spray head inlet for hydraulic connection of a cleaning fluid, a spray head outlet for directing the cleaning fluid at a planar surface of a louver, and a movable mount for positioning the spray head proximate the planar surface of the louver. The system may include a carriage frame attached to the cooling tower proximate the louver. The system may include the movable mount being movably mounted on the carriage frame and movable in at least two orthogonal directions along the planar surface of the louver. The system may include a control system for controlling movement of the movable mount on the carriage frame and supply of the cleaning fluid to the spray head so as to cause the cleaning fluid to be sprayed at preselected portions of the louver at preselected times.

9 Claims, 19 Drawing Sheets

(56) References Cited

OTHER PUBLICATIONS

"The Importance of Cooling Tower Cleaning and Maintenance", Mar. 26, 2023; pp. 1-5; Retrieved from the Internet: URL: https://coloradomechanical.com/the-importance-of-cooling-tower-cleaning-and-maintenance (5 pages).
"Role of Cooling Tower Air Inlet Louvers", Mar. 26, 2023; pp. 1-4; Retrieved from the Internet: URL: https://ggtglobal.com/blogs/cooling-tower-air-inlet-louvers/ (4 pages).
"Function of Louvers in Cooling Tower", Aug. 15, 2020; pp. 1-2; Retrieved from the Internet: URL: https://www.coolingtowerinfill.com/news/function-of-louvers-in-cooling-tower.html (2 pages).

* cited by examiner

View A-A

View B-B

AUTOMATIC SPRAYING MECHANISM FOR CLEANING AIR INLET LOUVERS OF COOLING TOWERS

BACKGROUND

Cooling tower air inlet louvers get clogged over time due to the continuous operation of the cooling towers. A fan draws ambient air in through the cooling tower louvers from one or more sides of the cooling tower. Over time and under continuous operation, debris, scale, and other obstructions accumulate in the louvers and restrict air flow.

Scale builds up with time due to the splashing out of water from inside the cooling tower. Clogging of inlet louvers, especially in counterflow cooling towers, restricts air passage through the louvers and minimizes efficiency. Accordingly, periodic maintenance is necessary to remove obstructions from the cooling tower air inlet louvers.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

This disclosure presents, in accordance with one or more embodiments, an apparatus for automatically spraying a cleaning fluid onto at least one louver of a cooling tower, the louver having an outwardly facing generally planar surface. The apparatus includes a spray head with a spray head inlet for hydraulic connection of the cleaning fluid, a spray head outlet for directing the cleaning fluid at the planar surface of the louver, and a movable mount for positioning the spray head proximate the planar surface of the louver. The apparatus also includes a carriage frame attached to the cooling tower proximate the louver. The movable mount is movably mounted on the carriage frame and movable in at least two orthogonal directions along the planar surface of the louver. The apparatus also has a control system for controlling movement of the movable mount on the carriage frame and for controlling supply of the cleaning fluid to the spray head so as to cause the cleaning fluid to be sprayed at preselected portions of the louver at preselected times.

This disclosure presents, in accordance with one or more embodiments, a system for automatically spraying a cleaning fluid from a fluid supply onto at least one louver of a cooling tower. The at least one louver has outwardly facing generally a planar surface. The system includes a pump with a pump outlet configured to receive the cleaning fluid from the fluid supply into a pump inlet and to pressurize the cleaning fluid to a pressurized fluid at a preselected pressure. The system includes a spray head with a spray head outlet configured to direct the cleaning fluid at the planar surface of the louver. The spray head has a spray head inlet and a movable mount for positioning the spray head proximate the planar surface of the louver. The system includes a conduit coupled to the pump outlet at a conduit first end and coupled to the spray head inlet at a conduit second end. The conduit delivers the pressurized fluid from the pump to the spray head. The system includes a carriage frame with a rail, a trolley, and a third orthogonal direction. The carriage frame is attached to the cooling tower proximate the louver. The movable mount is movably mounted on the carriage frame and movable in at least two orthogonal directions along the planar surface of the louver. The system includes an actuator to move, using the movable mount, the spray head along the rail, the trolley, and the third orthogonal direction. The system includes a control system with a control panel configured for user commands. The control system includes a power supply to power and to control movement of the movable mount. The control system includes a processor and a control memory connected to the processor. The control memory includes a set of instructions to perform a method. The method includes obtain a command to spray the pressurized fluid, turn on the pump to pressurize the cleaning fluid to the preselected pressure, direct the pressurized fluid at the planar surface of the louver, and move the spray head on a preselected path using the movable mount and the actuator.

This disclosure presents, in accordance with one or more embodiments, a method for automatically spraying a cleaning fluid from a fluid supply onto at least one louver of a cooling tower, the at least one louver having outwardly facing generally a planar surface. The method includes providing an apparatus for spraying the cleaning fluid, disposing the apparatus in proximity to the louver of the cooling tower, and obtaining, from a user to a control system, a command to spray the cleaning fluid. The method includes drawing the cleaning fluid, using an apparatus for spraying the cleaning fluid, from the fluid supply in hydraulic communication with a pump by turning on the pump of the apparatus to pressurize the cleaning fluid. The method includes pressurizing, using the pump of the apparatus, the cleaning fluid to form a pressurized fluid, and spraying the pressurized fluid onto the planar surface of the louver. The method includes moving a spray head, including a spray head outlet, on a preselected path using a movable mount and an actuator while spraying the cleaning fluid from the spray head outlet.

Other aspects and advantages of the claimed subject matter will be apparent from the following description and the appended claims.

DETAILED DESCRIPTION

Figure 1A:
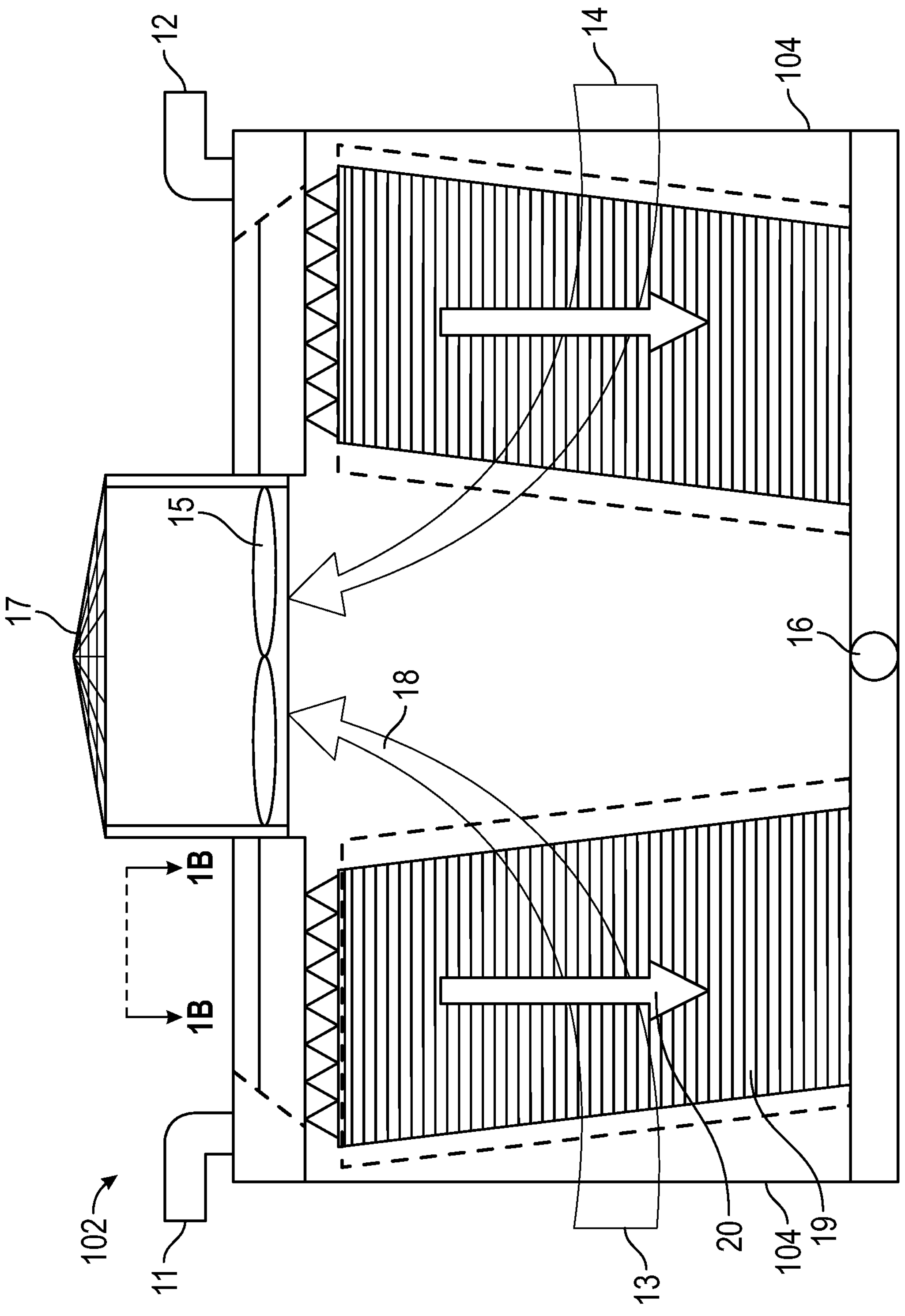
FIG. 1A, FIG. 1B, and FIG. 1C show an example of an induced-draft, crossflow cooling tower.

Disclosed herein are embodiments of an apparatus, a system, and a method to provide cleaning maintenance to barriers such as louvers of factory-assembled or field-erected cooling towers. Such cooling towers are those towers used, for example, for building heating, ventilation, and air conditioning (HVAC) systems. These louvers may become clogged with contaminants over time due to the continuous operation of the cooling towers. In induced-draft cooling towers, a fan draws ambient air into the cooling tower through the louvers. During operation contaminants such as debris and scale accumulate in the louvers and restrict air flow.

Embodiments disclosed herein describe a system and method to clean the louvers in place while the cooling tower is in service and remove accumulated debris automatically. In accordance with one or more embodiments, the system may be automated. A pumping system coupled to a cleaning head may be attached to a carriage frame to automatically clean the louvers in place. In accordance with one or more embodiments, the pumping system may operate in accordance with an industry standard such as, for example, medium pressure per ASME B31.3 Process Piping, chapter IX. The cleaning head may automatically move vertically, horizontally, and all around the cooling tower while spraying water or other cleaning fluid on the louvers. In accordance with one or more embodiments, the apparatus may include a control system. The motion of the cleaning head, both in speed and direction, as well as the pump parameters, may be preselected and/or controlled by the control system. The motion may be controlled by a switch, a controller, and/or a control panel. The control panel may be coupled to the control system. In accordance with one or more embodiments, cleaning fluid, such as water, may be provided to the pump system by a cleaning fluid supply hose. Electric power may also be provided to operate the pump and the controller, and to energize one or more actuators for moving the cleaning head.

FIGS. 1A-3B show variations of induced draft cooling towers. As can be seen, a fan 15 is located at the top of the cooling tower. For crossflow cooling towers, typically configured in a square or rectangular shape as viewed from above, the fan 15 draws air typically from only two sides (e.g., a first air inlet 13 and a second air inlet 14). For counterflow cooling towers the fan 15 draws air typically from all four sides of square or rectangular-configured cooling towers, and along the entire circumference of round or oval counterflow cooling towers. The air is drawn in through the louvers (e.g., in an air flow direction 18) and then across one or more of a heat transfer fill or filling (e.g., a fill 19), as is known in the art, and then out of an outlet (e.g., an air outlet 17). Common fill types include film fill and splash fill.

Figure 1B:
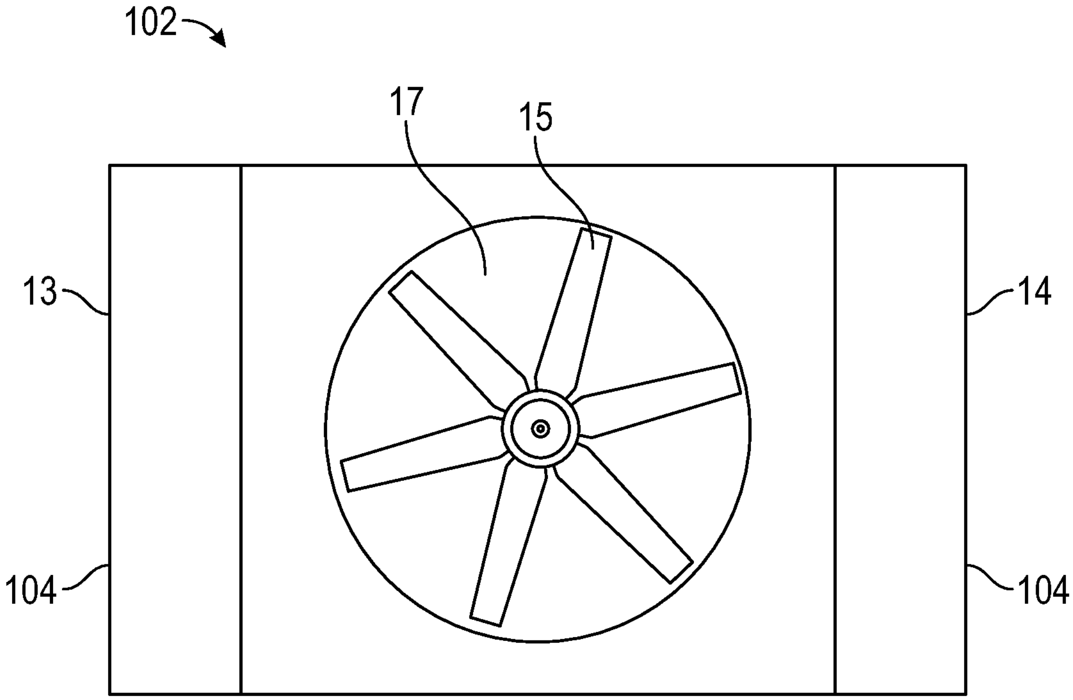
Figure 1C:
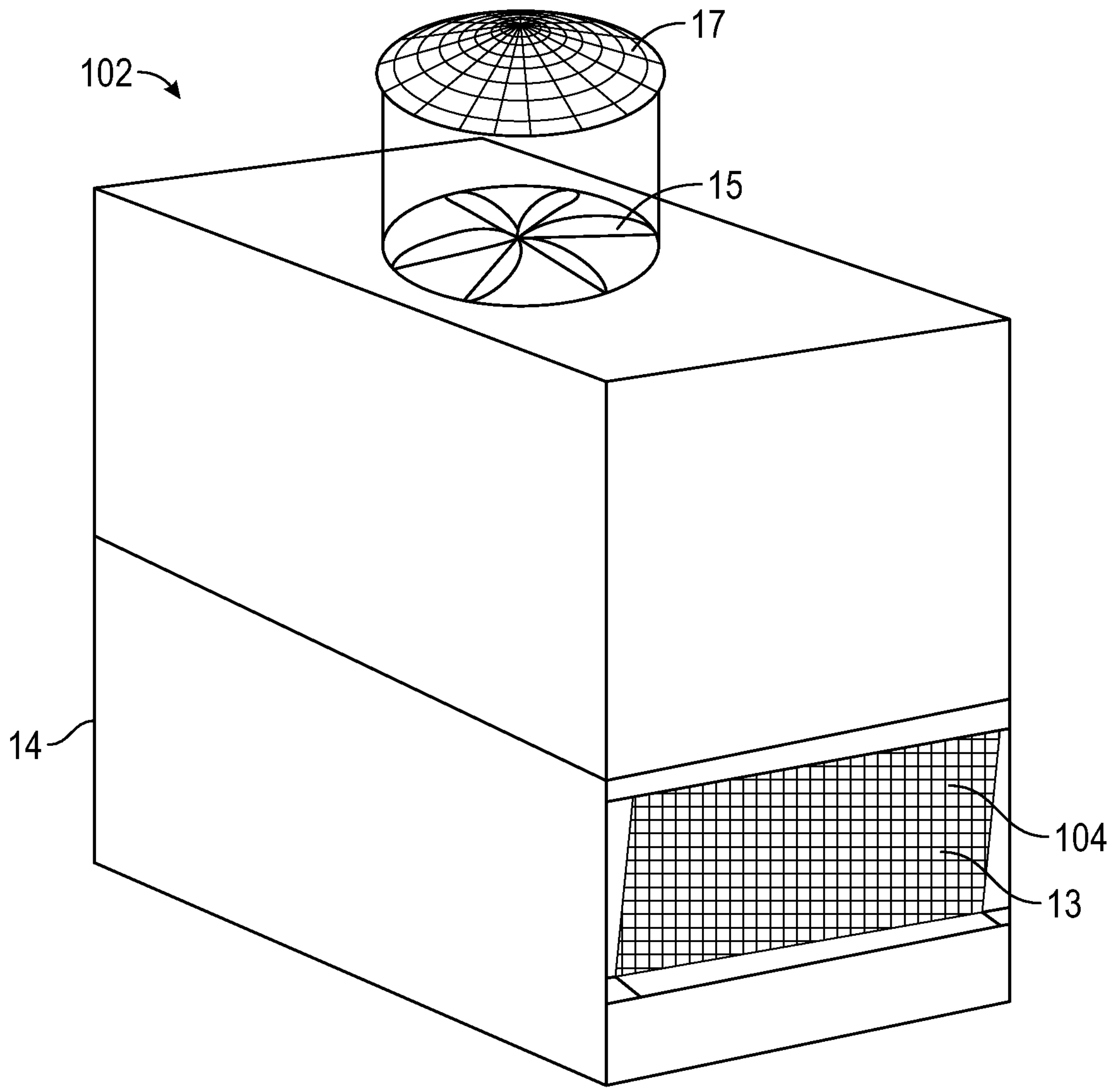

Shown in FIG. 1A, FIG. 1B, and FIG. 1C is an example of an induced-draft, crossflow cooling tower (e.g., a cooling tower 102) arranged in a generally rectangular shape as viewed from above. FIG. 1B shows a top view and FIG. 1C shows an isometric view of the cooling tower. The crossflow filling is arranged at a slight angle off of horizontal with respect to the base of the cooling tower. Cooling water enters at a first water inlet 11 and/or a second water inlet 12. The cooling water then falls in a water flow direction 20 onto a top surface at an edge of the filling that faces the interior of the cooling tower. Air flows generally sideways against the water falling down on the filling and across the water on the filling. The water exits the cooling tower 102 at a water outlet 16.

Figure 2A:
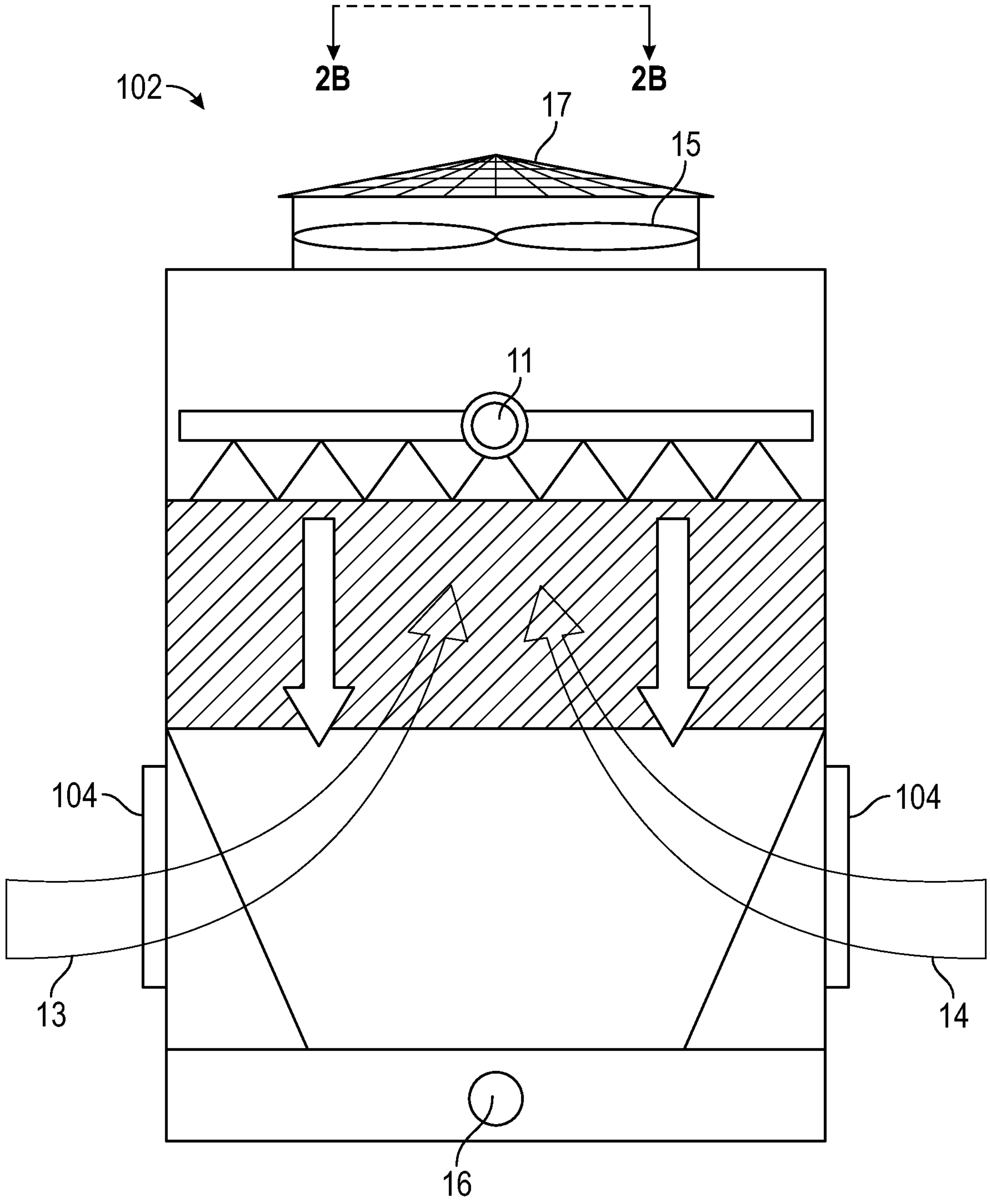
FIG. 2A, FIG. 2B, and FIG. 2C show an example of an induced-draft, counterflow cooling tower.
Figure 2B:
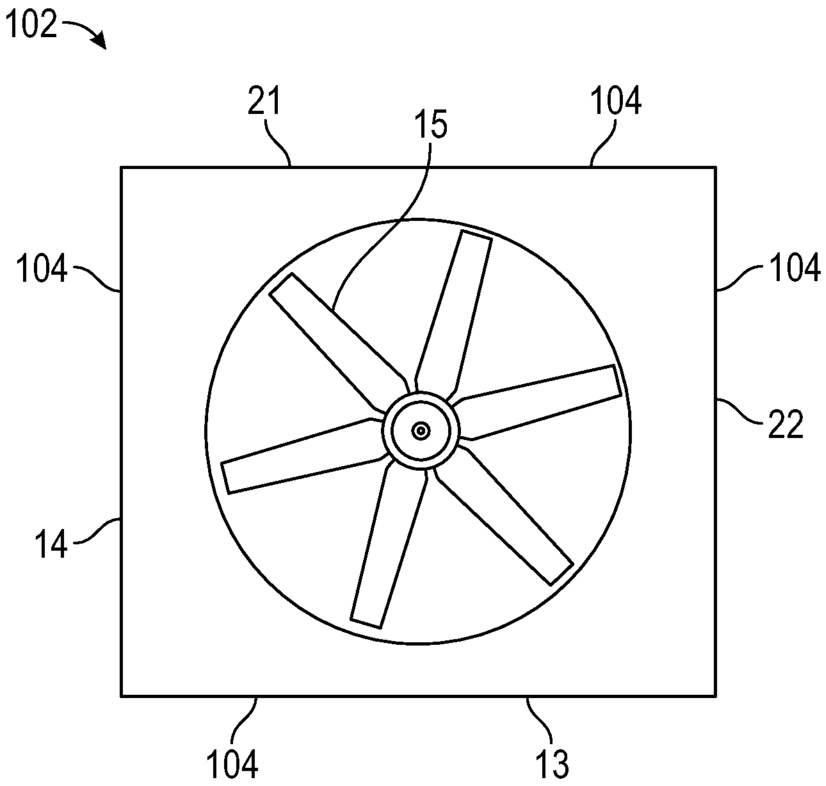
Figure 2C:
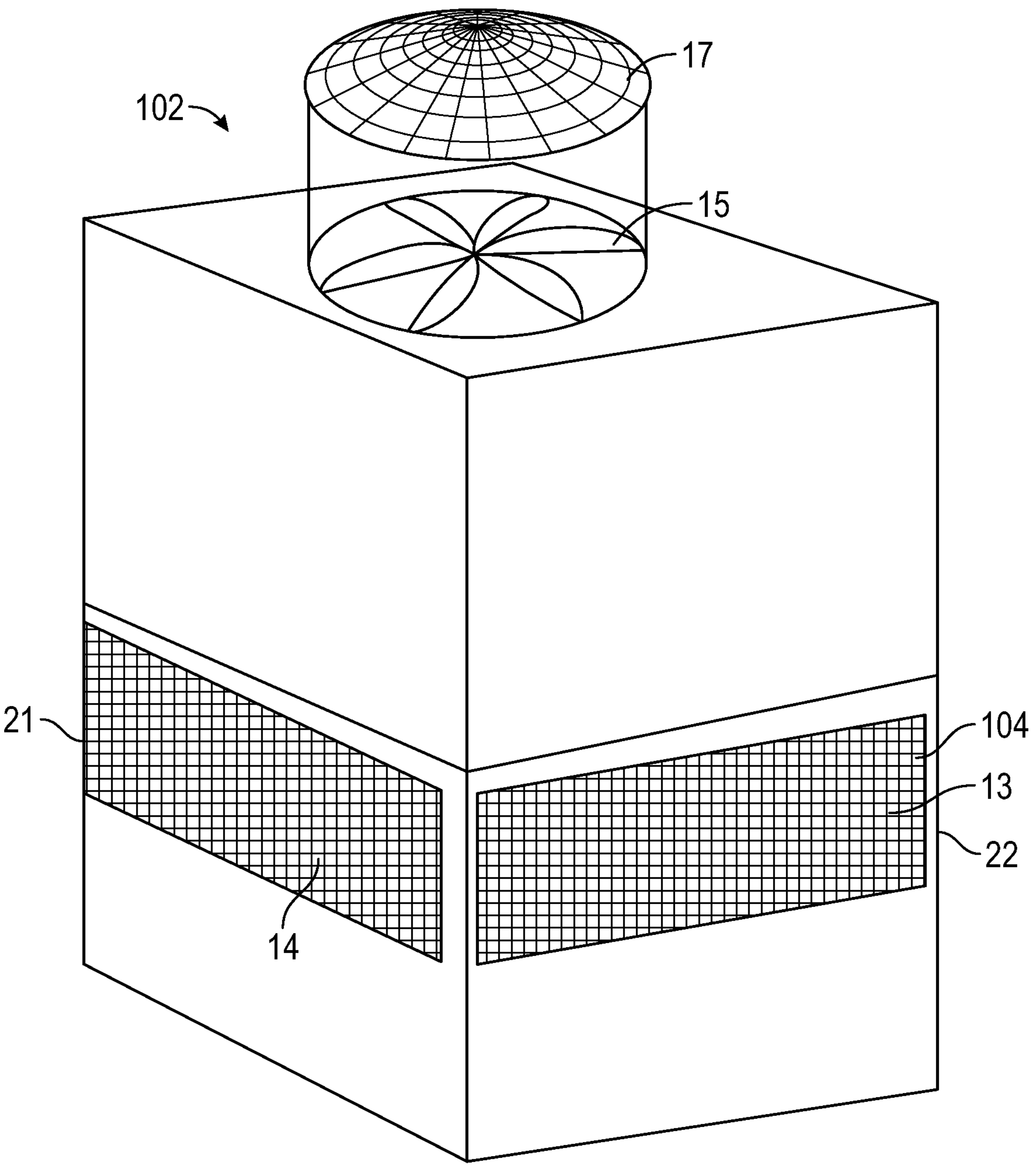
Figure 3A:
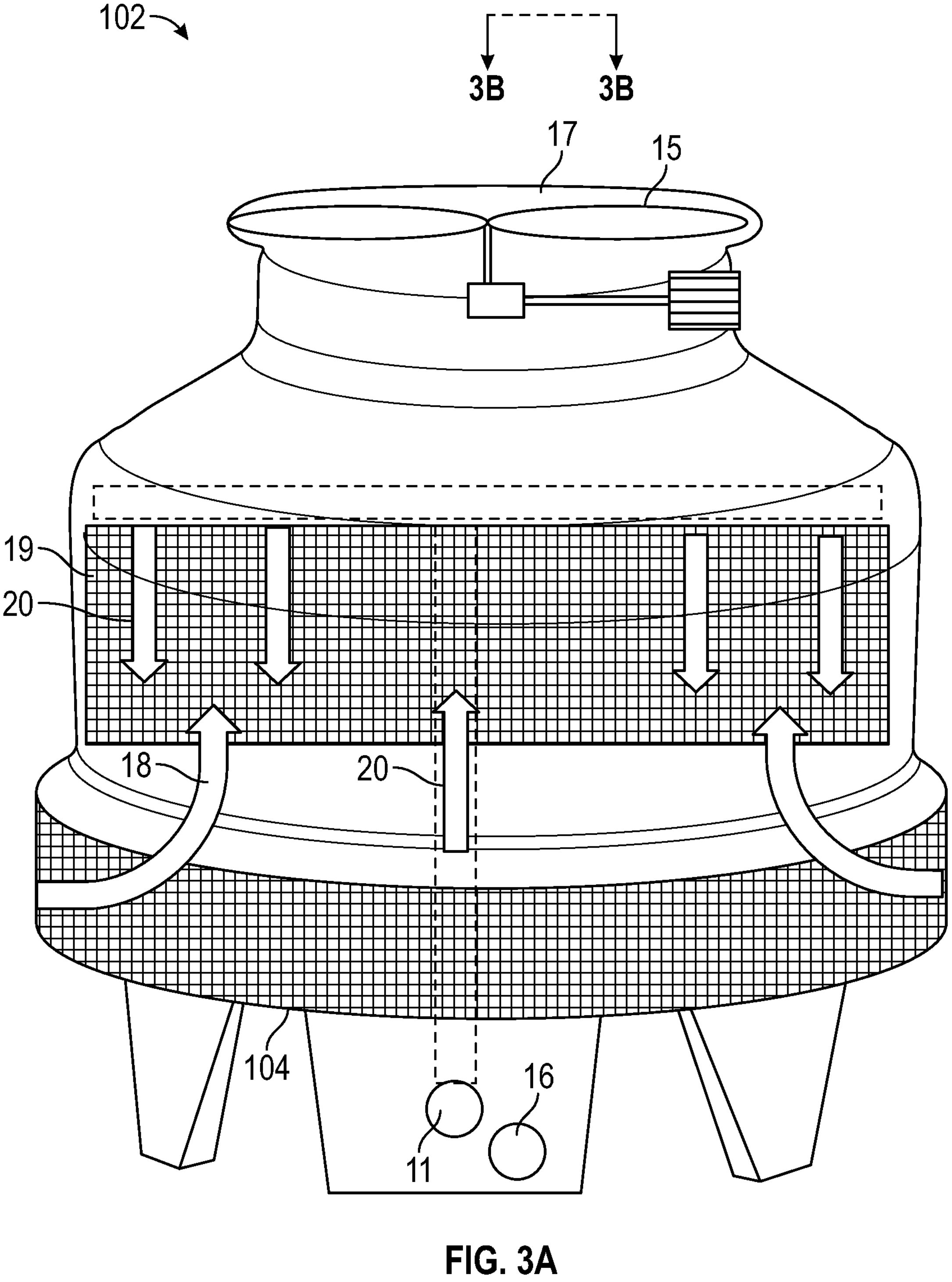
FIG. 3A and FIG. 3B show an example of a round cooling tower.
Figure 3B:
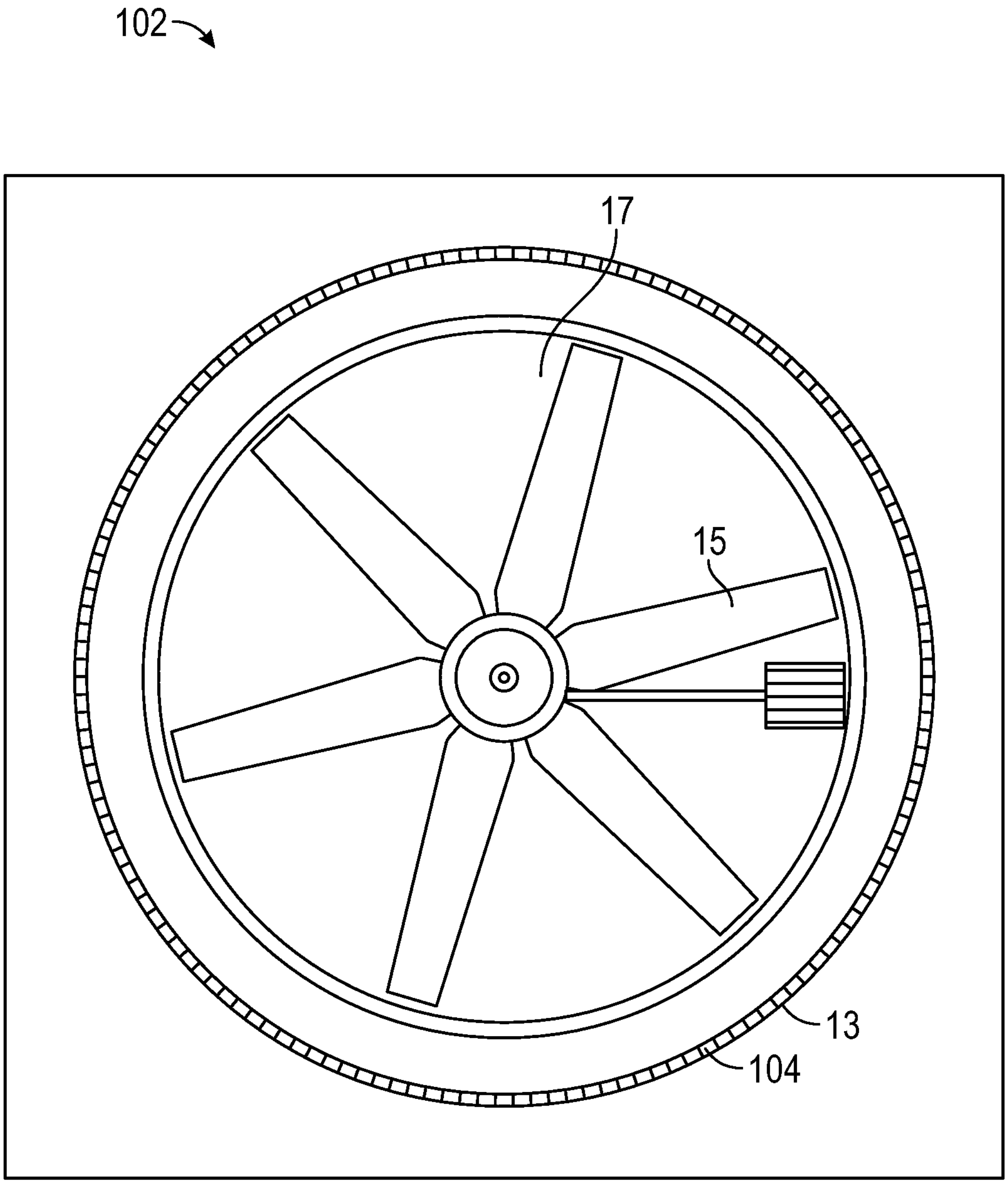

FIG. 2A, FIG. 2B, and FIG. 2C show an example of an induced-draft, counterflow cooling tower. FIG. 2B shows a top view and FIG. 2C shows an isometric view of the cooling tower. FIG. 3A shows a cross section and FIG. 3B shows a top view of a round cooling tower. Air is drawn from a portion or all of the circumference of round and/or oval cooling towers. The air is drawn through the louvers and then across the filling. The counterflow filling is arranged horizontally with respect to the base of the cooling tower and cooling water falls onto a top side of the filling. Air flows generally upward against the water falling down on the filling and, therefore, counter to the direction of the water on the filling.

Figure 4:
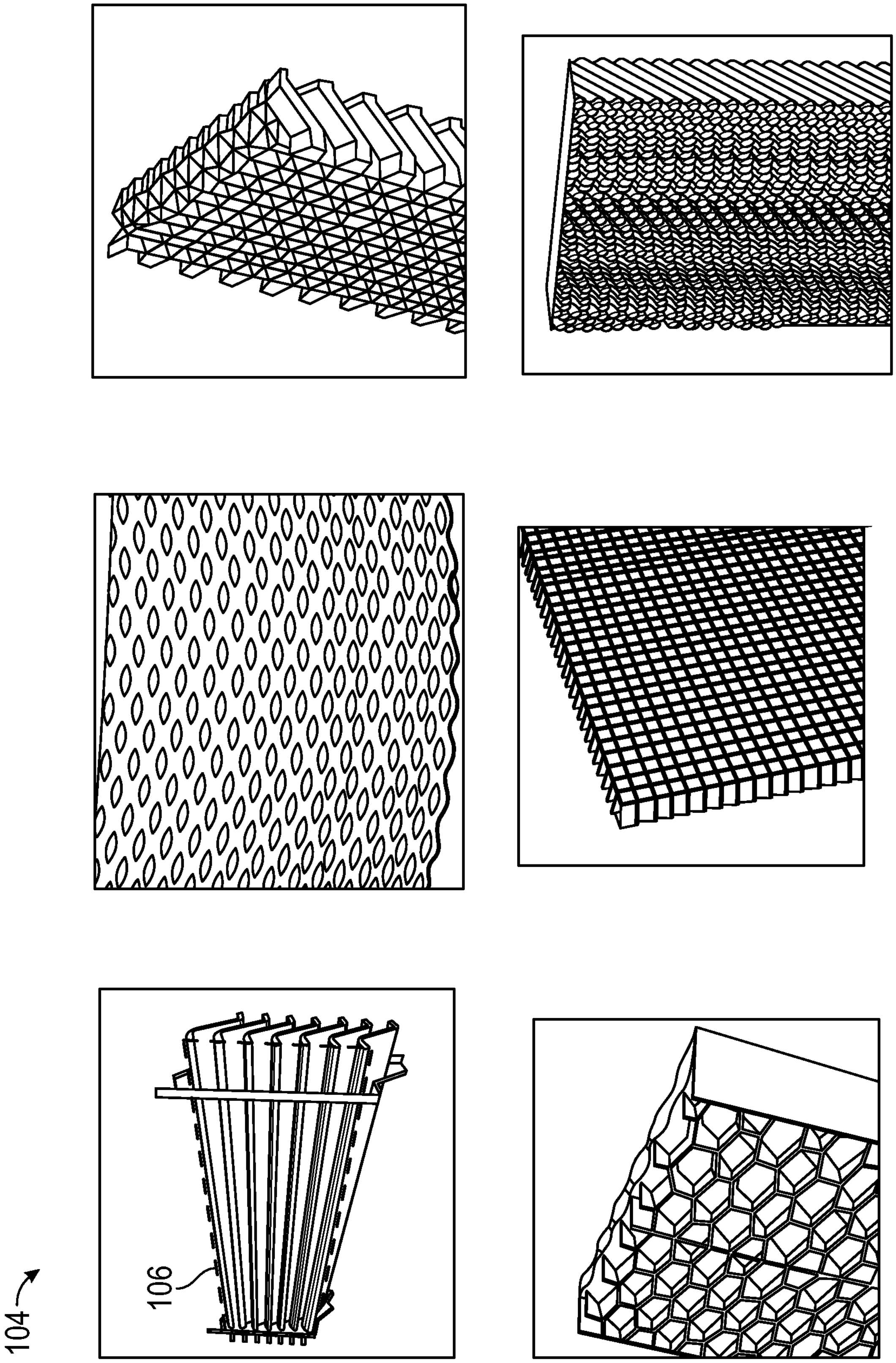
FIG. 4 shows examples of louver variations.

FIG. 4 shows examples of louver variations (e.g., a louver 104). Each louver may have an outwardly facing generally planar surface (e.g., a planar surface 106). Cooling tower air inlet louvers may be known in the art by several names and/or styles such as labyrinth, eggcrate, and slat. An example louver is made from a plastic material such as a PVC (polyvinyl chloride) and has dimensions of 1640 mm×810 mm×65 mm (64" (inches)×32"×2.6"). Cooling towers may be equipped with barriers such as grates, guards, or screens. Embodiments disclosed herein may apply to one or more of these various barriers, collectively known hereafter as "louvers." Clogging of louvers restricts air passage through the louvers and thus may reduce or minimize efficiency of the cooling tower. Contaminant build up and risk of clogging results in a need for periodic maintenance. Cleaning the louvers may be a manual process and that process may require removal of the louvers from the cooling tower. The removal may, in turn, require the use of scaffolding or other equipment for access at height. Furthermore, the periodic cleaning may occur at such time intervals that cause significant contaminant build-up and, therefore, prolonged and/or more complex cleaning cycle activities. Frequent periodic cleaning may prevent the contaminant build up, reduce the duration of or eliminate the manual cleaning, and reduce the complexity of the cleaning cycle.

Figure 5:
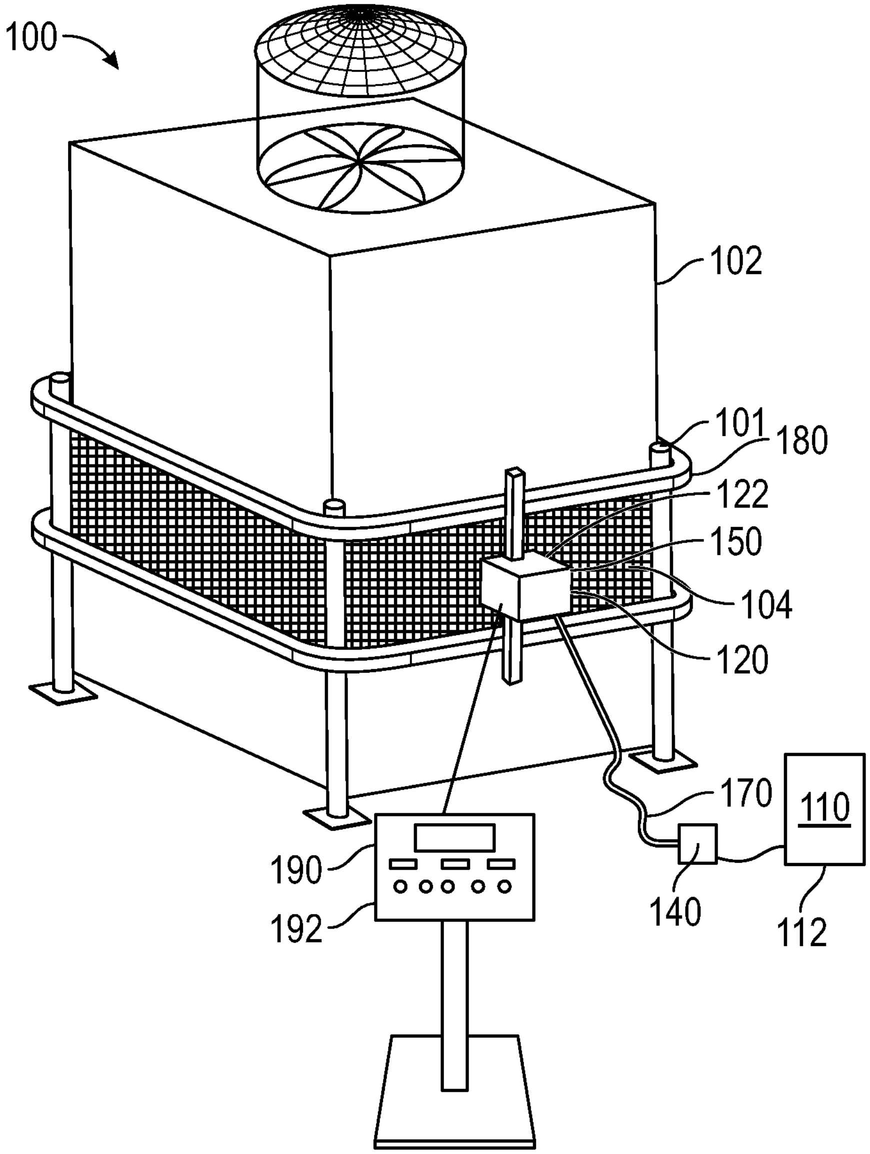
FIG. 5 shows a system in accordance with one or more embodiments.

FIG. 5 shows a system (e.g., a system 100) in accordance with one or more embodiments. One or more of the modules and/or elements shown in FIG. 5 may be omitted, repeated, combined, and/or substituted. Accordingly, embodiments disclosed herein should not be considered limited to the specific arrangements of modules and/or elements shown in FIG. 5. System 100 shows an apparatus 101 and an example of cooling tower 102. System 100 may include a remote pump, external power supply, uninterruptible power supply (UPS), internal power supply, utility air, and other components. The power supply may receive an input voltage of, for example, 110 or 220 VAC (volts alternating current) at 60 Hz (Hertz) of utility power. The cooling tower has at least one of louver 104.

The apparatus 101 includes a cleaning head 120 with a spray head 122. Cleaning head 120 is shown coupled to a heavy-duty sliding rails sub-system (e.g., a carriage frame 180). Cleaning head 120 is coupled to a pump 140 and a drive 150. Pump 140 draws cleaning fluid 110 through a conduit 170 coupled to a fluid supply 112. Pump 140 pressurizes cleaning fluid 110 and directs it out of spray head 122 onto the louver 104. Drive 150 moves cleaning head 120 along carriage frame 180 to direct the cleaning fluid 110 to sections of the cooling tower 102.

A control panel 192 may be coupled to the control system 190 to receive from a user a set of operational parameters and to monitor and to control the operational parameters of the apparatus 101. The user may enter target values as part of the set of operational parameters. The user may prepare a workflow that includes the set of operational parameters. The control system 190 may mathematically seek the target values associated with variables of the apparatus in response to feedback from a workflow in cooperation with the apparatus, the systems, and the method. For example, the workflow may include a pressurization cycle comprising a pressure and a duration of time. The workflow may also include a movement of the movable mount, and therefore the cleaning head, along the preselected route. The control system may use feedback from a sensor system and mathematically seek a target distance, a target pressure, and/or a target time duration.

Processor 196 may be used to perform a comparing of operational parameters. Processor 196 may be used to determine pressure of the fluid supply 112 and/or the pressurized fluid 114. Processor 196 may be used to determine position of the cleaning head 120 on the carriage frame 180. Processor 196 may work with one or more of a sensor 804 described below in FIG. 8 and the accompanying description. Processor 196 may be the same as or similar to that of computer processor 1218 described below in FIG. 12 and the accompanying description.

The carriage frame 180 may be installed around a perimeter of cooling tower 102 such as along each of four sides of cooling tower 102. The carriage frame may be supported, for example, at four corners of the carriage frame. The carriage frame 180 and the spray head 122 may be arranged proximate the louvers of cooling tower 102 and the spray head 122 may direct a cleaning medium such as the cleaning fluid 110 onto the planar surface 106 of the louver 104.

Figure 6:
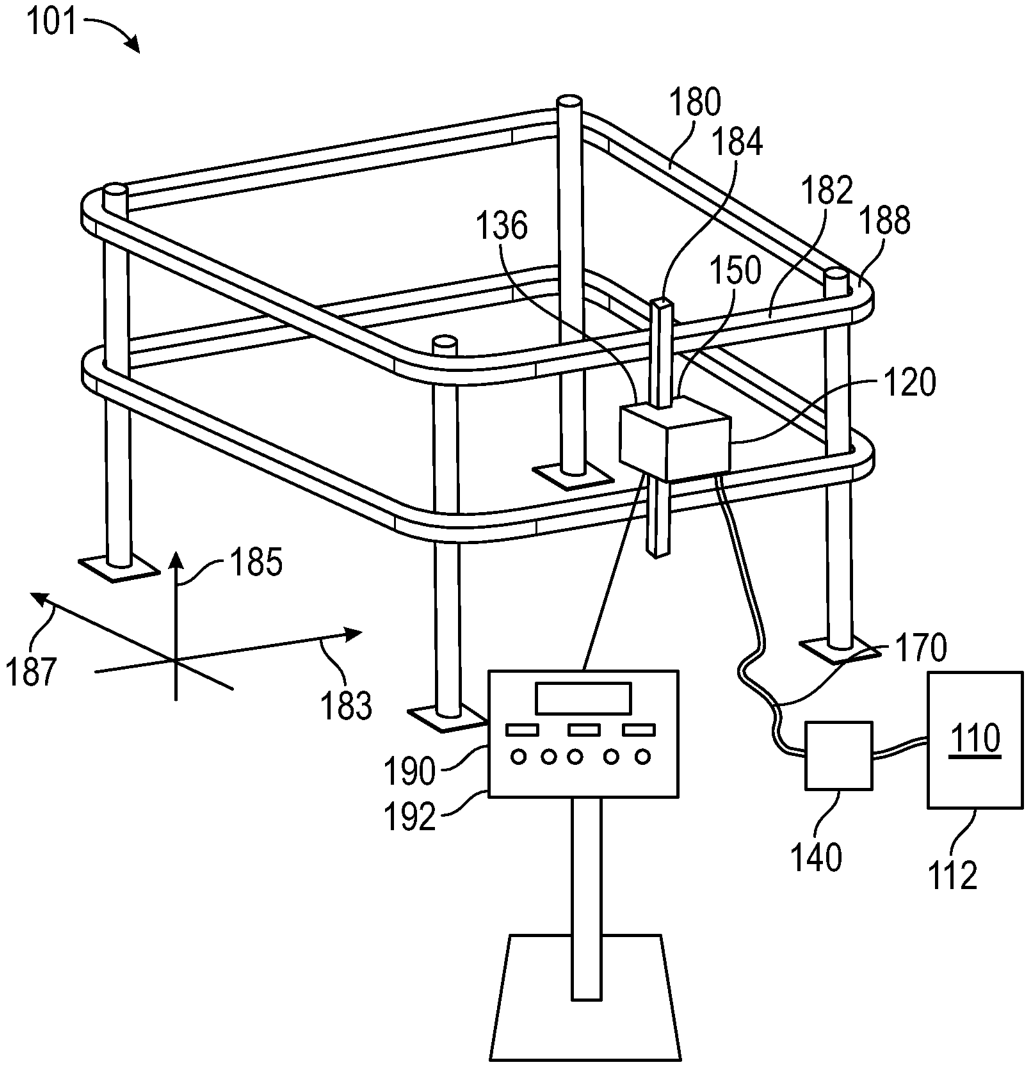
FIG. 6 shows that apparatus in accordance with one or more embodiments.

FIG. 6 shows that apparatus 101 in accordance with one or more embodiments. Apparatus 101 may have hydraulic and/or pneumatic lines such as pipes, tubes, hoses, etc., connecting the components. Pump 140 may be a low-pressure, medium-pressure, or high-pressure pump such as positive displacement pump or a centrifugal pump. A low pressure pump may operate with a Example pressure ranges may include fifty to eighty psi (pounds per square inch) for low-pressure, eighty to one thousand psi for a medium-pressure, and over one thousand psi for high-pressure.

The positive displacement pump may be a reciprocating plunger pump, a piston pump, or diaphragm pump. The positive displacement pump may be single-acting or double-acting. The piston pump and the plunger pump may be one cylinder or may have more than one cylinder. The pump driver may be an electric motor, an engine, or a linear motion electromagnetic driver. Pump 140 conveys the cleaning fluid 110 from the fluid supply 112 and may incorporate one or more valves, fittings, and regulators in a manifold to regulate the cleaning fluid 110 pressure and flowrate.

FIG. 6 shows that carriage frame 180 may have provision to support movement of cleaning head 120 using a movable mount 136 in one, two, and/or three orthogonal directions. For example, carriage frame 180 may have a series of rails oriented in three dimensions such as left and right (horizontally), up and down (vertically), and fore and aft (in and out) relative to a fixed position. Carriage frame 180 may be dimensioned to encompass the perimeter of some, part, or all of the cooling tower. In accordance with one or more embodiments the carriage frame 180 may have at least two orthogonal directions along the planar surface of the louver.

FIG. 6 shows that carriage frame 180 may include a drive 150 for driving the cleaning head 120 in each orthogonal direction. The drive 150 may be configured for movable mount 136 to move in each orthogonal direction individually or simultaneously. In accordance with one or more embodiments a rail 182 may be oriented to support movement of movable mount 136 in a first orthogonal direction 183 such as left and right. A trolley 184 may be oriented in a second orthogonal direction 185 such as up and down and may couple with the first orthogonal direction 183.

FIG. 6 shows that a third orthogonal direction 187 may be oriented in a direction such as fore and aft. A connector rail 188 may couple the rail 182 with trolley 184 and/or with third orthogonal direction 187. Connector rail 188 may be curved to form a curved connector rail to achieve the transition. In accordance with one or more embodiments the carriage frame 180 may be in a square shape, a rectangular shape, a circular shape, an oval shape, or any appropriate shape to accommodate the cooling tower shape. The square shape may comprise equal length rails in the first orthogonal direction and in the third orthogonal direction. The rectangular shape may comprise a rail with a first rail length oriented in the first orthogonal direction and a rail with a second rail length oriented in the third orthogonal direction 187. The circular shape may comprise a rail formed with a circumference of a magnitude large enough to encircle, either in part or in whole, the cooling tower. The oval shape may have two or more curved rails and one or more straight rails in combination to encompass the cooling tower.

The carriage frame may have one or more of the rails 182. The carriage frame may comprise an upper and lower rail. The upper rail may be positioned at a first proximity with respect to the cooling tower and the lower rail may be positioned at a second proximity with respect to the cooling tower.

The carriage frame may have one or more trolleys. A first trolley may be disposed at a first portion of the cooling tower and a second trolley may be disposed at a second portion of the cooling tower. The first trolley may be spaced from the second trolley around the perimeter of cooling tower. The first trolley may be spaced above or below the second trolley.

Figure 7:
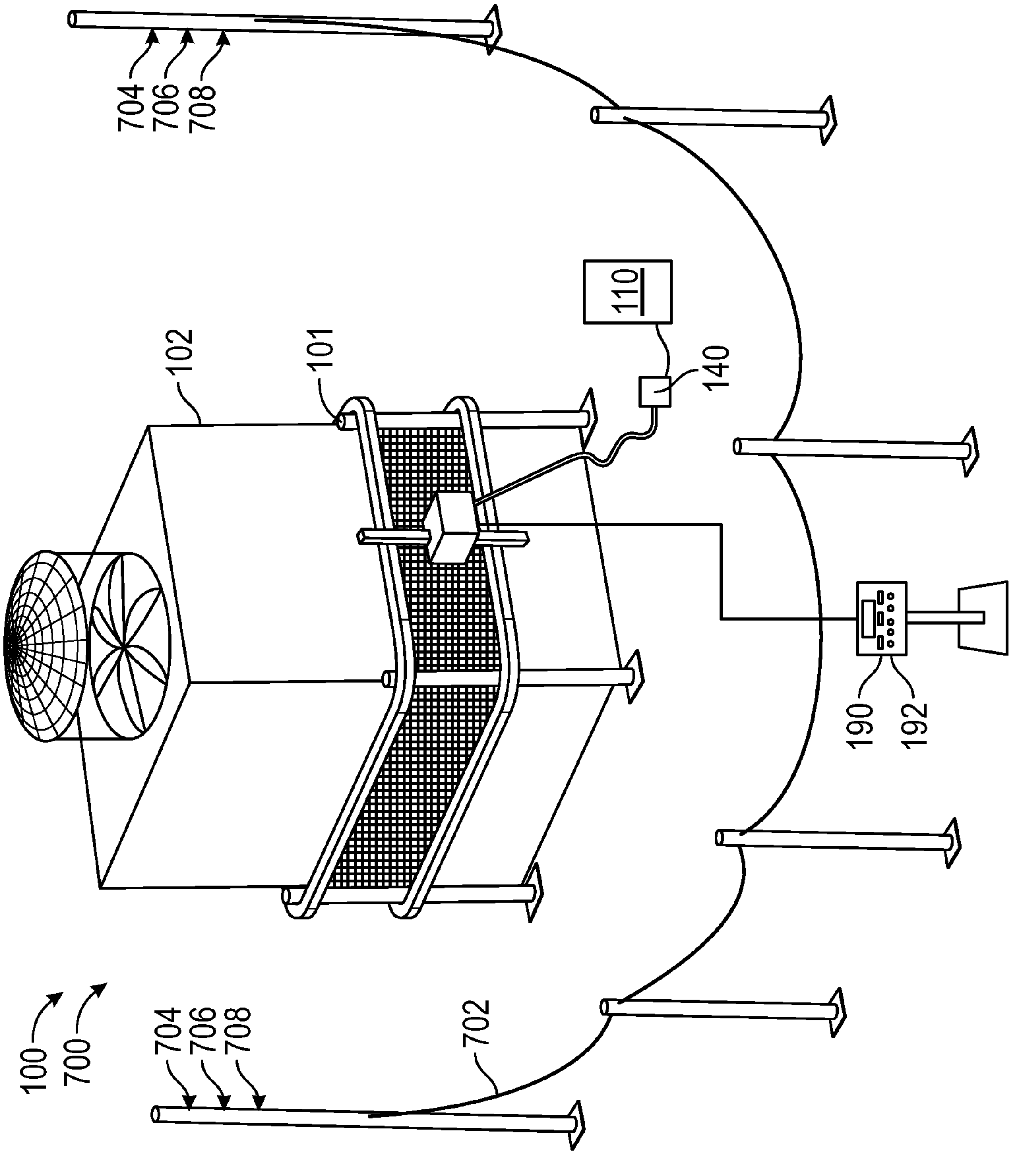
FIG. 7 shows an example setup of the system and the apparatus in accordance with one or more embodiments.

FIG. 7 shows an example setup of system 100 and apparatus 101. System 100 may include safety and surveillance accessories (e.g., accessories 700) such as one or more of each of a personnel exclusion barrier 702, a motion detector 704, a proximity sensor 706, and/or a camera 708. One or more of the safety and surveillance accessories may be operatively coupled to the control system 190.

Figure 8:
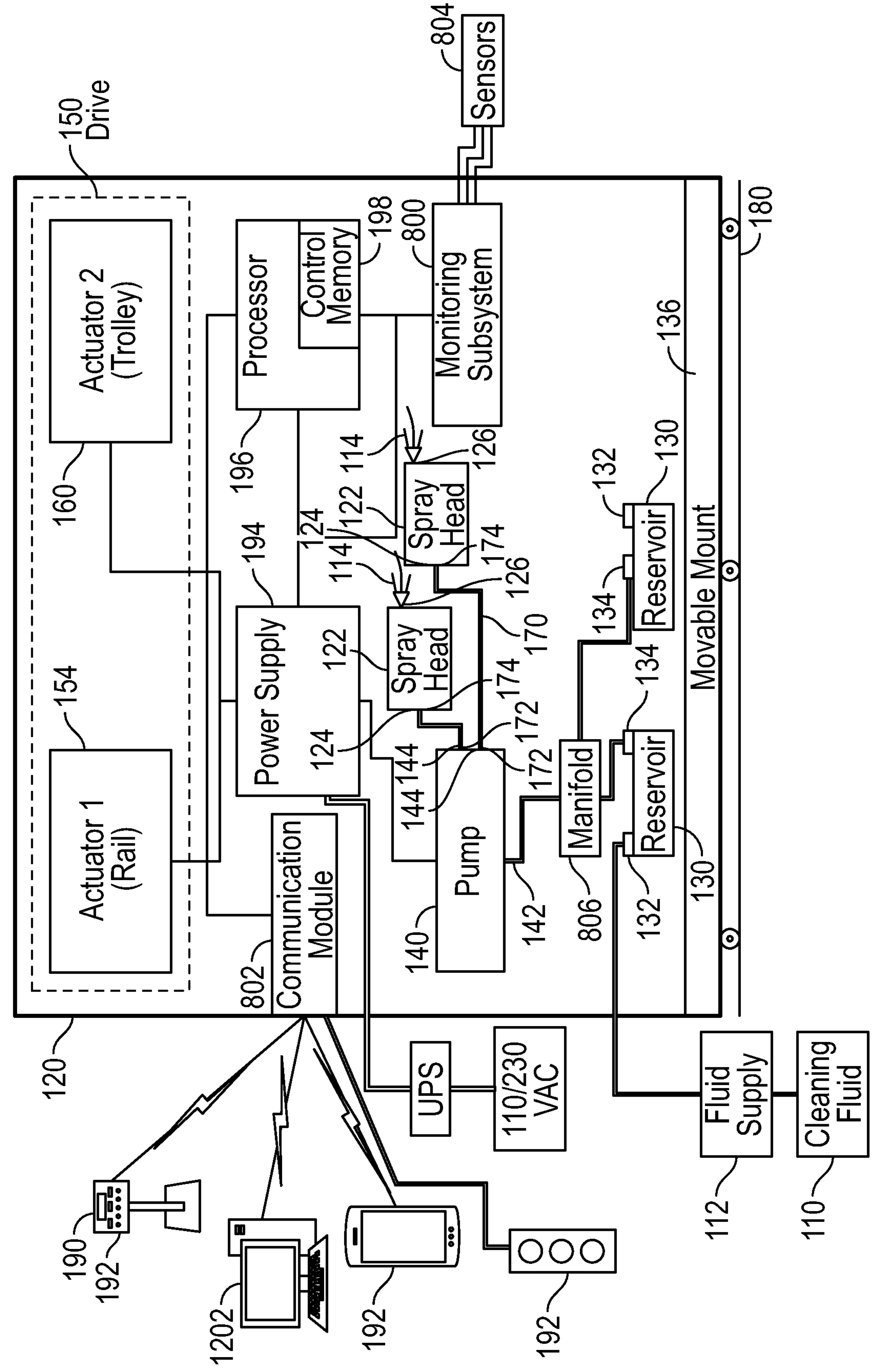
FIG. 8 shows the cleaning head in accordance with one or more embodiments.

FIG. 8 shows the cleaning head 120 in accordance with one or more embodiments. The cleaning head 120 may include the spray head 122 and the movable mount 136 for movably coupling the spray head 122 to the carriage frame 180. Cleaning head 120 may have one or more reservoirs 130. Each of the implementations of the reservoir 130 may have a reservoir inlet 132 and a reservoir outlet 134 and may hold cleaning fluid 110 or other substance. FIG. 8 shows that the spray head 122, the pump 140, a manifold 806, and the drive 150 may be enclosed within the cleaning head 120 coupled to the carriage frame 180. Pump 140 may have one or more of a pump inlet 142 and one or more of a pump outlet 144. Pump outlet 144 may be configured to couple to the conduit first end 172 and a spray head inlet (a head inlet 124) may be configured for a hydraulic connection to the conduit second end 174. Pump 140 may be disposed within, on, or outside of cleaning head 120. Pump 140 may be disposed between the fluid supply 112 and/or the reservoir outlet 134 and a spray head outlet (a head outlet 126). Pump 140 may be configured to receive the cleaning fluid 110 from the fluid supply 112 and/or the reservoir 130.

FIG. 8 shows the pump 140 in accordance with one or more embodiments. The pump 140 may be in hydraulic communication with the fluid supply 112 and/or the reservoir 130 and may draw the cleaning fluid 110 from fluid supply 112 and/or from reservoir 130 and pressurize the cleaning fluid 110 to a preselected pressure such as a target pressure to form a pressurized fluid 114 at the preselected pressure. Pump 140 may pressurize cleaning fluid 110 at a preselected flowrate such as a target flowrate. Spray head 122 may deliver cleaning fluid 110 to head outlet 126 and may direct the pressurized fluid 114 onto planar surface 106 of louver 104. Reservoir 130 may be filled at reservoir inlet 132 and/or reservoir inlet 132 may be hydraulically coupled to fluid supply 112. Pump 140 may be configured to draw cleaning fluid 110 from fluid supply 112 and reservoir 130 simultaneously and/or intermittently. The type of cleaning fluid 110 from fluid supply 112 and from reservoir 130 may differ. For example, cleaning fluid 110 from fluid supply 112 may be utility water and cleaning fluid 110 from reservoir 130 may comprise a water at a second temperature and/or it may comprise a solvent, surfactant, detergent, and/or acid. Apparatus 101 may have a second pump to draw cleaning fluid 110 from reservoir 130 and deliver cleaning fluid 110 to head outlet 126.

FIG. 8 shows that the control panel 192 may be coupled to control system 190. Control system 190 may include a monitoring subsystem 800, a communication module 802, a power supply 194, a processor 196, and a control memory 198 coupled to processor 196. Control panel 192 may be used as the interface between a user and the apparatus 101. Control panel 192 may be configured for user commands and user inputs. Control panel 192 may use power supply 194 in combination with the monitoring subsystem to control operation of apparatus 101 through the control system 190. Control panel 192 may include a power switch, a controller, and/or a control switch. Control panel 192 may be coupled to the apparatus 101 and or to the control system 190 using a wired or a wireless connection. Control panel 192 may include an input interface used, for example to input cleaning cycles, pressure settings, flow rates, durations, travel speeds, positions, etc.

Drive 150 may be controlled by an electrical circuit coupled to the first actuator 154 and the second actuator 160. The pump 140 and/or the drive 150 may be operated by the control system 190 with signals received from a user such as a user providing commands from the controller, such as control panel 192. Apparatus 101 may incorporate a wide range of speeds, loads, and conditions and may all be controlled by a controller switch, such as control panel 192.

The monitoring subsystem may include one or more of the sensor 804 (e.g., pressure transmitter, timer, flow meter, linear transducers, proximity sensors etc.) configured to measure, for example, pump output pressure, cleaning fluid flowrate, etc. The monitoring subsystem 191 may include a display showing all system parameters, monitored parameters, and the set of operational parameters, such as pressure, temperature, and flowrate parameters, including a protection system to provide limit alarm trips and one or more program interlocks. The set of operational parameters may include those entered by a user in the workflow through the control panel 192.

Control system 190 may integrate readiness states from the monitoring subsystem 800. Readiness states may include confirming function of the personnel exclusion barrier(s), the motion detector(s), the proximity sensor(s), and/or the camera(s). Readiness states may include confirming function of interlocks such as a closing latch 1104 described below in FIG. 11 and the accompanying description. The user may enter into the control system the data required to define the preselected path of the cleaning head. The control system may receive from the monitored subsystem readiness states from which the control system may determine operational state of the apparatus. For example, the control system may receive a readiness state of the motion detectors and of the fluid supply 112 pressure prior to commencing a pressurization cycle on the preselected route.

In accordance with one or more embodiments the conduit 170, such as a water supply hose, may deliver cleaning fluid 110 from fluid supply 112. Fluid supply 112 may incorporate a stop valve, a regulating valve, and/or a choke in manifold 806 to control and regulate the incoming flow of cleaning fluid 110. The cleaning fluid 110 may then flow through manifold 806 and into pump inlet 142 of pump 140. The pressurized fluid 114 continues flowing out of pump outlet 144 and into head inlet 124 of the spray head 122. Pressurized fluid 114 flows through spray head 122 and out of head outlet 126. The hydraulic path from fluid supply 112 to the pump 140 may not use manifold 806. The hydraulic path from fluid supply 112 to the pump 140 may use a reservoir in the hydraulic path between the fluid supply 112 and the manifold 806. The fluid supply 112 may be the reservoir 130 containing cleaning fluid 110. The cleaning fluid 110 may flow from the reservoir 130 through the manifold 806 into pump 140. The cleaning fluid 110 may flow from the reservoir 130 directly into pump 140.

Figure 9A:
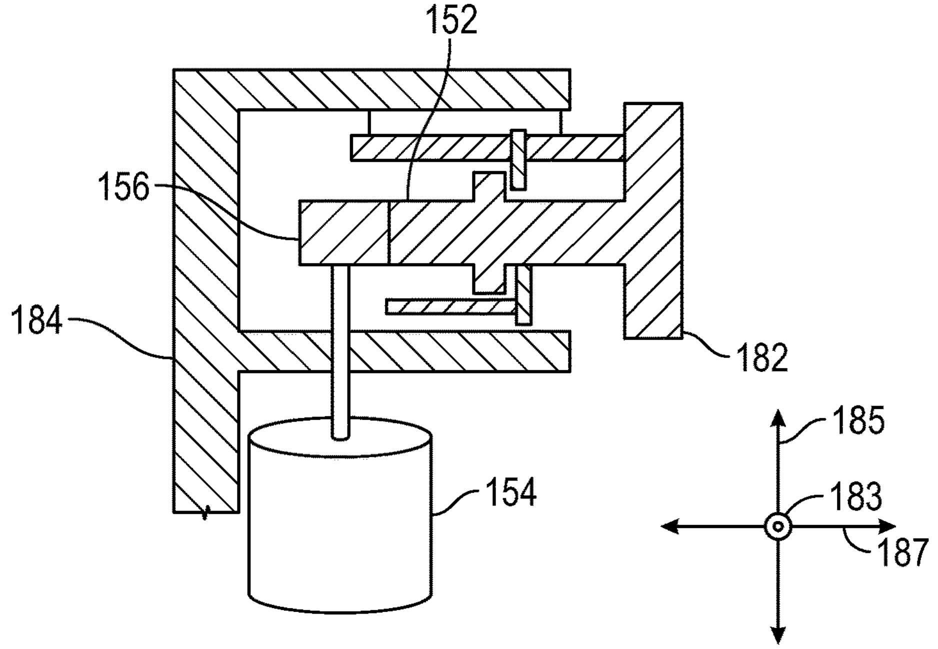
FIG. 9A and FIG. 9B show the drive, the rail rack, and the trolley rack in accordance with one or more embodiments.
Figure 9B:
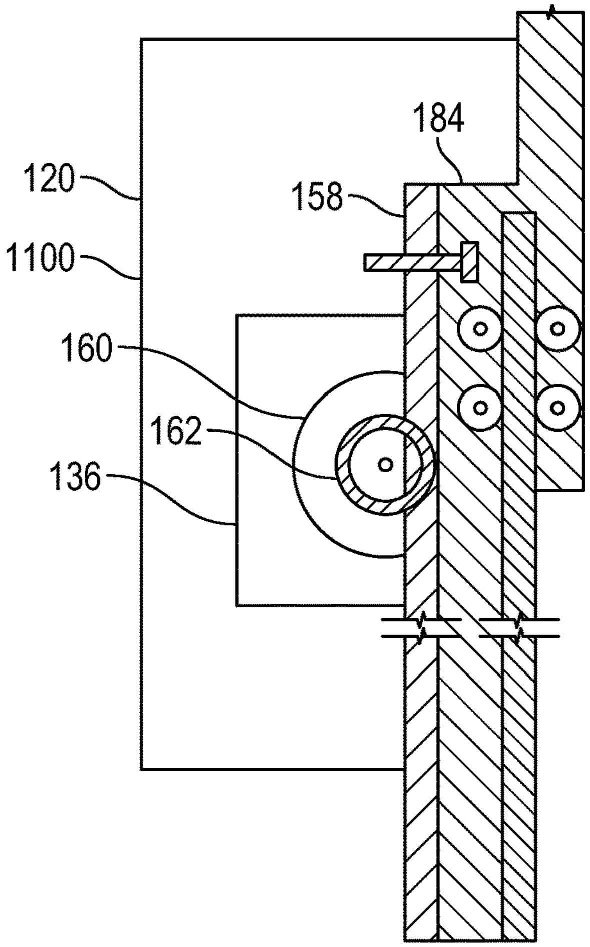

FIG. 9A and FIG. 9B show the drive, the rail rack, and the trolley rack in accordance with one or more embodiments. Drive 150 may move along first orthogonal direction 183 and second orthogonal direction 185. In like manner, the drive 150 may be applied to the third orthogonal direction 187. Drive 150 may be configured with a rack and pinion drive system. In accordance with one or more embodiments a gear rack may comprise gear teeth configured to cooperate with corresponding gear teeth on a pinion gear.

FIG. 9A shows a rail rack in accordance with one or more embodiments. A gear rack (a rail rack 152) fixed to the rail 182 may cooperate with a first pinion (a first driver 156) coupled to a first actuator 154 such that the first actuator 154, fixed to the movable mount 136, which in turn is fixed to the cleaning head 120, rotates first driver 156 against rail rack 152 thereby causing the cleaning head 120 to move along the length of rail 182. FIG. 9A also shows an embodiment of the bearings coupling the trolley 184 to the rail 182.

FIG. 9B shows a trolley rack in accordance with one or more embodiments. A gear rack (a trolley rack 158) fixed to the trolley 184 may cooperate with a second pinion (a second driver 162) coupled to a second actuator 160 such that the second actuator 160, fixed to the movable mount 136, which in turn is fixed to the cleaning head 120, rotates second driver 162 against trolley rack 158, fixed to trolley 184, thereby causing the cleaning head 120 to move along the length of trolley 184. First actuator 154 and/or second actuator 160 may be hydraulically, pneumatically, or electrically operable without limitation. FIG. 9B also shows an embodiment of the bearings coupling the movable mount 136 to the trolley 184.

The movable mount 136 and/or the trolley 184 may be actuated by a spline gear operating on a splined-profile shaft. The following discloses an implementation of motion control using the spline gear operating on a splined-profile shaft to move the trolley 184 along the rail 182. The splined-profile shaft may be rotatably coupled to the movable mount 136. The splined-profile shaft may be coupled to one or more rack gears (first driver 156). At least one of the rack gears may engage a rail rack 152 such that rotating the splined-profile shaft coupled to the movable mount 136 rotates the first driver 156 and thereby propels the movable mount 136 in a direction parallel to that of the rail rack 152.

The first actuator 154 may be coupled to a gear such as a worm gear (first driver 156) configured to engage a mating gear with a splined internal diameter (the spline gear) disposed on the splined-profile shaft. Torque output of the first actuator 154 transfers to the first driver 156 which in turn transfers the torque to the spline gear mating with the first driver 156 and disposed on the splined-profile shaft thereby rotating the first driver 156 engaged on the rail rack 152. In this manner the trolley 184 travels along the rail rack 152. In this implementation the first actuator 154 and the second actuator 160 may operate simultaneously. When the movable mount 136 moves, the spline gear slides along the splined-profile shaft thereby unencumbering the motion of the movable mount 136.

In accordance with one or more embodiments the movable mount 136 and/or the trolley 184 may be actuated by a worm screw (a worm driver) and a geared-profile shaft. The following discloses an implementation of motion control using the worm driver and geared-profile shaft to move the trolley 184 along the rail 182. The geared-profile shaft may be rotatably coupled to the movable mount 136. The geared-profile shaft may be coupled to one or more rack gears (first driver 156). At least one of the rack gears may engage the rail rack 152 such that rotating the geared-profile shaft coupled to the movable mount 136 rotates the first driver 156 and, thereby, propels the movable mount 136 in a direction parallel to that of the rail rack 152.

The first actuator 154 may be coupled to a gear such as a worm gear (first driver 156) configured to engage the geared-profile shaft. Torque output of the first actuator 154 transfers to the first driver 156 which in turn transfers the torque to the geared-profile shaft thereby rotating the first driver 156 engaged on the rail rack 152. In this manner the trolley 184 travels along the rail rack 152. The worm gear may bind if the first actuator 154 and the second actuator 160 are activated simultaneously unless the following design parameters are met to allow the worm gear to back spin or back drive, as it is known in the art (hereafter back drive.) The back drive is analogous to a steering wheel of an automobile rotating by itself due to steering forces exerted on the automotive tires. The back drive of the first actuator 154 thereby unencumbers the motion of the movable mount 136. The first actuator 154 may be designed to have, when not activated, a torque that is lower than the torque of the first driver 156 on rail rack 152 to move the trolley 184. For example, a pneumatic motor may rotate relatively freely when not activated.

The design parameters to enable back drive are known in the art to be that the worm gear profile between the worm driver on the first actuator 154 and the geared-profile shaft has a static friction coefficient ($\mu_s$) that is less than the tangent of the lead angle of the worm gear. I.e., the friction angle between the worm and the geared-profile shaft must be smaller than the lead angle of the worm. In this manner when the second actuator 160 operates, the first actuator 154 will back drive.

Although embodiments disclosed herein describe use of a rack and pinion style of drive, this is not intended to be limiting. Any suitable drive providing similar functionality to that described may also be implemented without departing from the scope of the present disclosure. For example, the gear rack(s) may be replaced by a roller chain and a roller chain sprocket. The gear rack(s) may be replaced by a toothed belt and a toothed belt sprocket.

The following discloses an implementation of motion control using the roller chain and the roller chain sprocket to move the trolley 184 along the rail 182. A toothed belt and a toothed belt sprocket may replace the roller chain and the roller chain sprocket. The movable mount 136 may be coupled to first actuator 154 via trolley 184. First actuator 154 may be coupled to a roller chain sprocket on the output shaft of first actuator 154 and engaged with a rail roller chain coupled to rail 182 such that when first actuator 154 rotates, the movable mount 136 moves via trolley 184 and, thereby, moves the cleaning head 120 along the length of rail 182. Likewise, the movable mount 136 may be coupled to second actuator 160. Second actuator 160 may be coupled to a roller chain sprocket on the output shaft of second actuator 160 and engaged with a trolley roller chain coupled to trolley 184 such that when second actuator 160 rotates, the movable mount 136 moves and thereby moves the cleaning head 120 along the length of trolley 184.

The movable mount 136 may be coupled, via trolley 184, to a link of a rail roller chain and the first actuator 154 may be coupled to a roller chain sprocket on the shaft of first actuator 154 and engaged on the rail roller chain. First actuator 154 may be coupled to the rail 182, such that when first actuator 154 rotates, the chain moves along the rail and pulls the movable mount 136. The first actuator 154 may be disposed on connector rail 188. The first actuator 154 may be disposed on rail 182. Similarly, movable mount 136 may be coupled to a link of a trolley roller chain and the second actuator 160 may be coupled to a roller chain sprocket on the shaft of second actuator 160 and engaged on the trolley roller chain. Second actuator 160 may be coupled to trolley 184 such that when second actuator 160 rotates, the chain moves along the trolley and pulls the movable mount 136 along trolley 184.

The first driver 156 may comprise a friction driver such as a rubber wheel configured to cooperate with a contact surface for first driver 156 disposed on rail rack 152 to move trolley 184 along rail 182. Likewise, the second driver 162 may comprise a friction driver such as rubber wheel configured to cooperate with a contact surface for second driver 162 disposed on trolley rack 158 to move movable mount 136 along trolley 184.

The trolley 184 may be coupled to the rail 182 (FIG. 9A) and/or the movable mount 136 may be coupled to the trolley 184 (FIG. 9B) using any combination of bearings, slots, rails, bushings, wheels, pins, studs, nuts, screws, and bolts. Bearings may include linear bearings, sliding bearings such as ball bearings, cylindrical roller bearings, spherical roller bearings, tapered roller bearings, and/or journal bearings on one or both of the movable mount 136 and/or the rail 182 and/or the trolley 184. Any suitable coupler providing similar functionality to that described may also be implemented without departing from the scope of the present disclosure. The components of apparatus 101 including carriage frame 180 may be constructed of high-strength, corrosion-resistant material to minimize corrosion when in its intended outdoor wet environment. The control panel may be connected to the apparatus using a suitable means such as screws, bolts, welds, etc. and using suitable materials such as angle iron, cold-rolled steel, hot-rolled steel, aluminum, etc. In one or more embodiments, an electrical cable harness may be used to connect some or all of the electrical components of system 100. The electrical cable harness is also configured to transmit current, keep control over the system, and provide connection to the monitoring subsystem.

The first actuator 154 may comprise a motion controller such as a pneumatic cylinder, a hydraulic cylinder, an in-line motor, and/or an electromagnetic linear actuator. First actuator 154 may be horizontally-oriented. First actuator 154 may be coupled at a horizontal cylinder static end to a carriage frame cylinder point on the carriage frame 180. First actuator 154 may be fastened at a horizontal cylinder dynamic end to a trolley 184 cylinder point. In this implementation the first actuator 154 may move trolley 184 as first actuator 154 extends and retracts. Likewise, second actuator 160 may comprise a motion controller. Second actuator 160 may be vertically-oriented. Second actuator 160 may be coupled at a vertical cylinder static end to a trolley cylinder point on the trolley 184. Second actuator 160 may be fastened at a vertical cylinder dynamic end to a movable mount 136 cylinder point. In this implementation, the second actuator 160 may move movable mount 136 as the second actuator 160 extends and retracts.

The first actuator 154 may comprise one or more of a bell-crank or one or more of a crankshaft with a linkage for moving the trolley 184 along the rail 182 and/or the movable mount 136 along the trolley 184.

The movable mount 136 and/or the trolley 184 may be actuated by a jack screw that cooperates with a jack nut. The following illustration discloses application of the jack screw motion control to the movable mount 136. The jack screw may be coupled at a jack screw trolley end to a trolley jack first point of the trolley 184 such that the trolley 184 prevents the jack screw from rotating and trolley 184 receives thrust along an axis of the jack screw. The jack nut comprises a jack nut internal thread that engages an external thread on the jack screw. The jack screw extends through the jack nut. A jack screw second end may be coupled to a trolley jack second point of the trolley 184 or the jack screw second end may remain uncoupled. The jack screw thread may be, for example, a square thread, a trapezoidal thread such as an acme thread, or any other appropriate thread profile. The jack nut may comprise a jack nut external gear profile. The jack nut may be rotatably supported by the movable mount 136 along an axis of the jack nut and the jack screw. The jack nut may rotate along the length of the jack screw and the jack nut may react against the movable mount 136. In this manner, axial displacement between the jack nut and the jack screw reacts between the movable mount 136 and the trolley 184 thereby displacing the movable mount 136 along the length of trolley 184.

The second actuator 160 may be coupled to a vertical motion gear (second driver 162). The vertical motion gear may have a vertical motion external gear profile. The vertical motion external gear profile may engage the jack nut external gear profile. The second driver 162 rotates the jack nut using torque from the second actuator 160 thereby transferring torque from second actuator 160 into axial displacement between movable mount 136 and trolley 184 along the length of trolley 184. The jack nut gear and the second driver 162 corresponding to the jack nut gear may be, for example, a worm gear or a pinion gear. The jack nut gear and the second driver 162 may be a straight-cut gear, a spiral bevel gear, a helical-cut gear, a hypoid gear, or any other appropriate gear style. This arrangement may be applied in like manner to motion of the trolley for displacement of trolley 184 along the length of rail 182.

Figure 10:
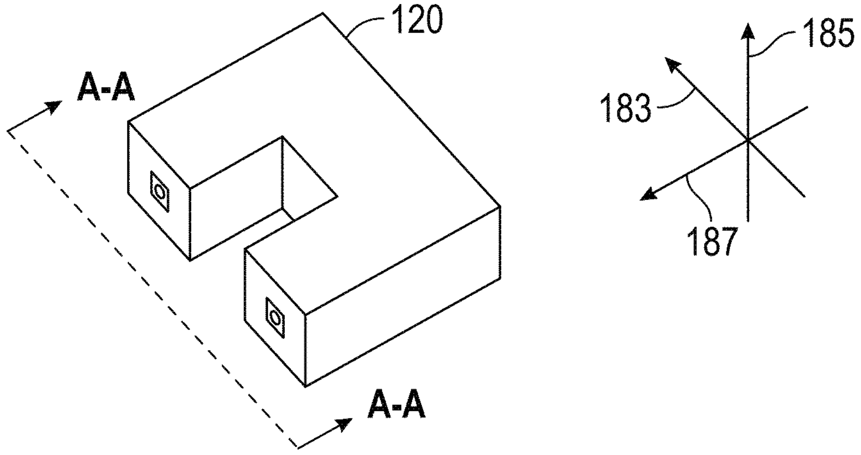
FIG. 10, FIG. 10A, and FIG. 10B show the cleaning head in accordance with one or more embodiments.
Figure 10A:
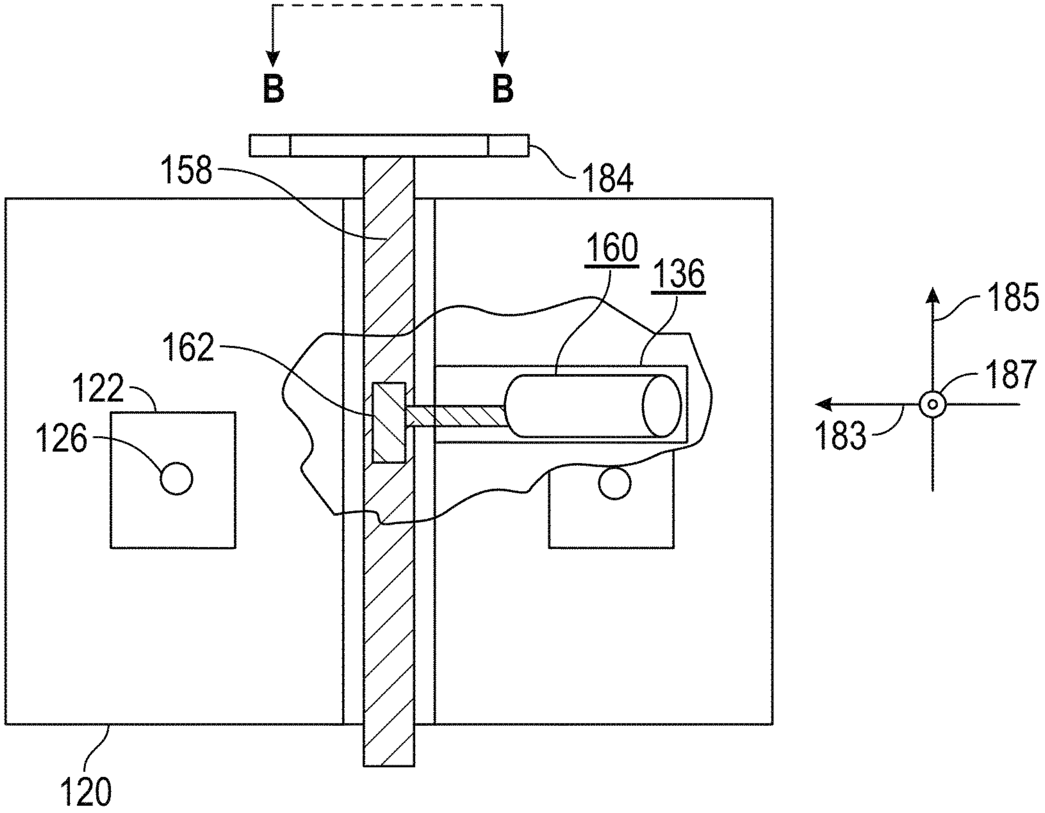
Figure 10B:
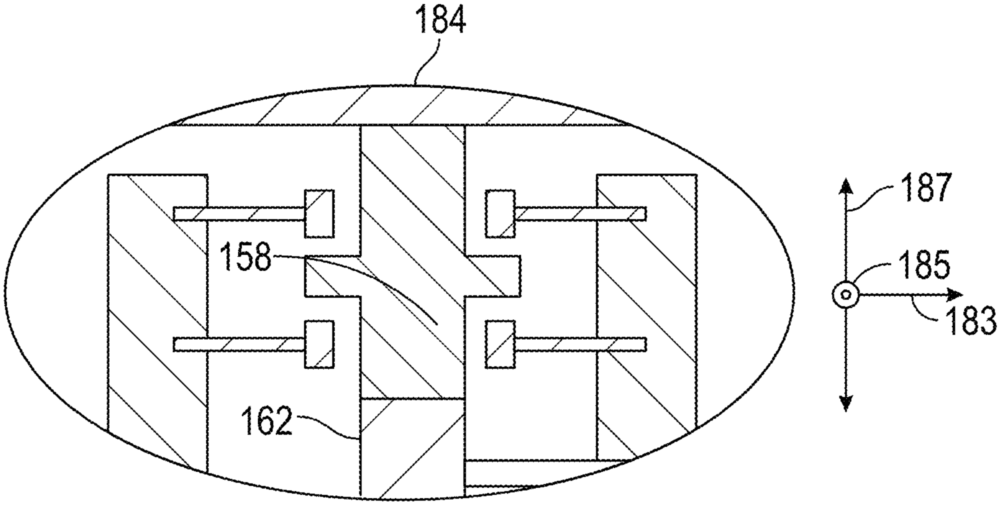

FIG. 10, FIG. 10A, and FIG. 10B show the cleaning head 120 in accordance with one or more embodiments. The cleaning head 120 may include more than one of the spray head 122. FIG. 10B also shows another embodiment of the bearing details of the movable mount 136 coupled to the trolley 184 as shown in FIG. 9A. In accordance with one or more embodiments the apparatus 101 may implement any combination of gears, sprockets, wheels, cylinders, motors, shafts, bearings, motion control, etc. providing similar functionality to that described without departing from the scope of the present disclosure.

Figure 11:
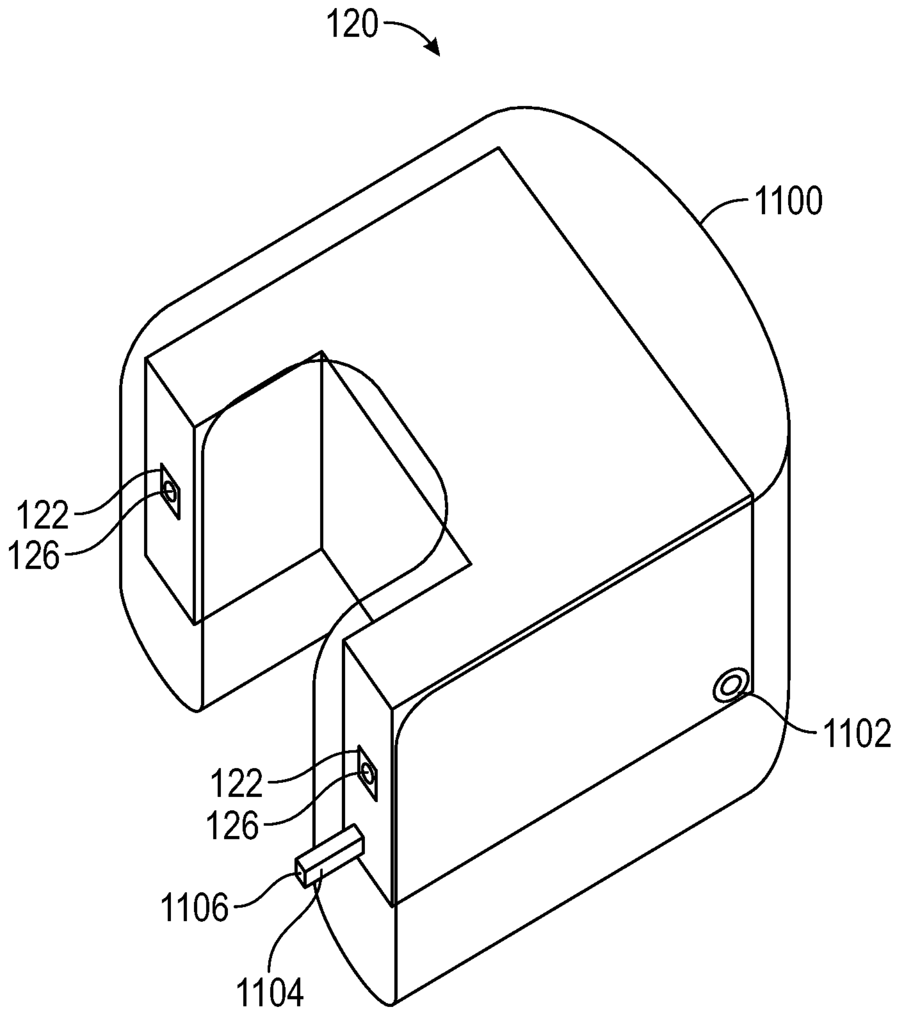
FIG. 11 shows the cleaning head cover in accordance with one or more embodiments.

FIG. 11 shows that the cleaning head 120 may include a cover 1100 configured to provide protection to the components of the cleaning head 120. Cover 1100 may include a hinge 1102. Protection may include protection against intrusion of objects, water, rain, sun, dust, and debris, and may provide protection to users and bystanders from accidental contact. The cleaning head 120 may include a water ingress protection (IP) rating such as IP66 and the IP rating may be certified by a certification authority. The IP rating may meet or exceed an international standard such as International Electrotechnical Commission code IEC 60529 and corresponding with Euronorm 60529. The cleaning head 120 may include a closing latch 1104 equipped with an interlock switch 1106 to apply or remove power to the washing mechanism such as the cleaning head 120, the pump 140, and/or the control system 190. The closing latch prevents the system from operating by interrupting the flow of electricity to the system when a specific condition is met or not met. The closing latch may be used in cases such as during preventive maintenance, repair work, or any other reason. The closing latch may be triggered by activating an emergency shut down such as an emergency push button. Upon activation of the emergency shut down, the closing latch cuts off the power supply thereby preventing the automated mechanism from moving.

Apparatus 101 may include interlock switches disposed in or on the apparatus 101 to provide interlocks, via control system 190, to the starting point and to the ending point of the travel of the cleaning head 120 along the carriage frame 180. In addition to the travel interlock switches, the apparatus may include mechanical end stops to limit travel. The end stops may be disposed on the carriage frame. The end stops provide a positive means of stopping the cleaning head and/or the trolley travel in the event that the control system and/or the drive do not operate as intended. In this manner the end stops will not be used during normal operation as a means to stop travel. The end stops may include bumpers disposed on the end stops and/or the carriage frame. The end stops may be configured to absorb impacts if the movement of the cleaning head and/or the trolley contacts the end stops. The system may include sensors such as the accessories 700 including one or more of a motion detector 704, surveillance camera (the camera 708), and/or proximity sensor 706 in proximity to the apparatus and/or the cooling tower.

One or more computer-readable media associated with the control system 190 may also include computer-executable instructions (a program) configured to collect, store, parse, and analyze the operational data of the apparatus. The program may be configured to perform operations consistent with embodiments of the present disclosure, for example, determine current state variables of apparatus, adjust various operating characteristics based on determined values, etc. The program may further arithmetically calculate revised state variables that seek output state goals, such as for example, mathematically seeking target values associated with variables of the apparatus in response to feedback from a workflow in cooperation with the apparatus, the systems, and the methods of the present disclosure. While the apparatus may correspond to the single pump, in some embodiments, the system may correspond to multiple pumps.

The control system may also include a computer system that is the same as or similar to that of computer 1202 described below in FIG. 12 and the accompanying description.

Figure 12:
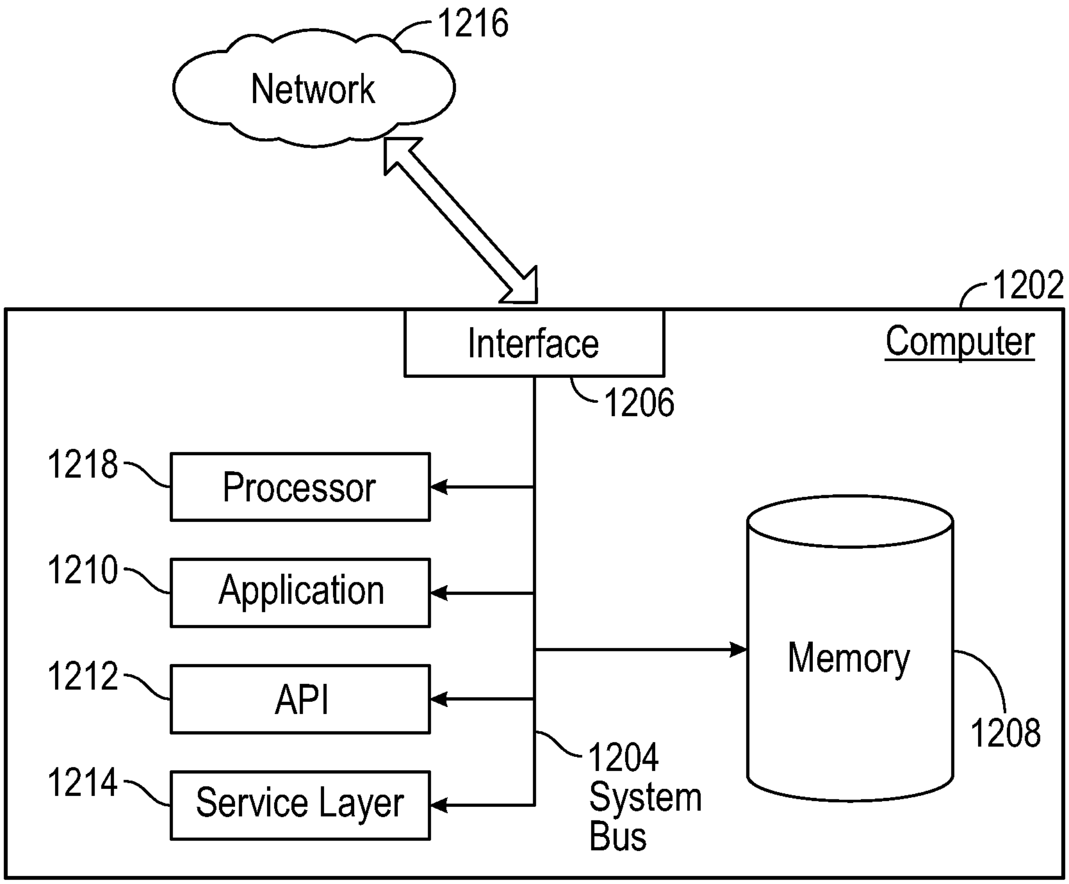
FIG. 12 shows a computing system in accordance with one or more embodiments.

FIG. 12 is a block diagram of a computer 1202 used to provide computational functionalities associated with described algorithms, methods, functions, processes, flows, and procedures as described in the instant disclosure, according to an implementation. Computer 1202 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 1202 may include a computer that includes an input device, such as a keypad, keyboard, touch screen, or other device that can accept user information, and an output device that conveys information associated with the operation of the computer 1202, including digital data, visual, or audio information (or a combination of information), or a graphical user interface (GUI.)

The computer 1202 can serve in a role as a client, a network component, a server, a database or other persistency, or any other component (or a combination of roles) of a computer for performing the subject matter described in the instant disclosure. The computer 1202 is communicably coupled with a network 1216. In some implementations, one or more components of the computer 1202 may be configured to operate within environments, including cloud-computing-based, local, global, or other environment (or a combination of environments).

At a high level, the computer 1202 is an electronic computing device operable to receive, transmit, process, store, or manage data and information associated with the described subject matter. According to some implementations, the computer 1202 may also include or be communicably coupled with an application server, e-mail server, web server, caching server, streaming data server, business intelligence (BI) server, or other server (or a combination of servers).

The computer 1202 can receive requests over network 1216 from a client application (for example, executing on another computer 1202) and responding to the received requests by processing the said requests in an appropriate software application. In addition, requests may also be sent to the computer 1202 from internal users (for example, from a command console or by other appropriate access method), external or third-parties, other automated applications, as well as any other appropriate entities, individuals, systems, or computers.

Each of the components of the computer 1202 can communicate using a system bus 1204. In some implementations, any or all of the components of the computer 1202, both hardware or software (or a combination of hardware and software), may interface with each other or the interface 1206 (or a combination of both) over the system bus 1204 using an application programming interface (API 1212) or a service layer 1214 (or a combination of the API 1212 and service layer 1214. The API 1212 may include specifications for routines, data structures, and object classes. The API 1212 may be either computer-language independent or dependent and refer to a complete interface, a single function, or even a set of APIs. The service layer 1214 provides software services to the computer 1202 or other components (whether or not illustrated) that are communicably coupled to the computer 1202.

The functionality of the computer 1202 may be accessible for all service consumers using this service layer. Software services, such as those provided by the service layer 1214, provide reusable, defined business functionalities through a defined interface. For example, the interface may be software written in JAVA, C++, or other suitable language providing data in extensible markup language (XML) format or another suitable format. While illustrated as an integrated component of the computer 1202, alternative implementations may illustrate the API 1212 or the service layer 1214 as stand-alone components in relation to other components of the computer 1202 or other components (whether or not illustrated) that are communicably coupled to the computer 1202. Moreover, any or all parts of the API 1212 or the service layer 1214 may be implemented as child or sub-modules of another software module, enterprise application, or hardware module without departing from the scope of this disclosure.

The computer 1202 includes an interface 1206. Although illustrated as a single one of the interface 1206, more than one of the interface 1206 may be used according to particular desires or implementations of the computer 1202. The interface 1206 is used by the computer 1202 for communicating with other systems in a distributed environment that are connected to the network 1216. Generally, the interface 1206 includes logic encoded in software or hardware (or a combination of software and hardware) and operable to communicate with the network 1216. More specifically, the interface 1206 may include software supporting one or more communication protocols associated with communications such that the network 1216 or interface's hardware is operable to communicate physical signals within and outside of the computer 1202.

The computer 1202 includes at least one of a computer processor 1218. Although illustrated as a single one of the computer processor 1218, two or more processors may be used according to particular desires or particular implementations of the computer 1202. Generally, the computer processor 1218 executes instructions and manipulates data to perform the operations of the computer 1202 and any algorithms, methods, functions, processes, flows, and procedures as described in the instant disclosure.

The computer 1202 also includes a memory 1208 that holds data for the computer 1202 or other components (or a combination of both) that can be connected to the network 1216. For example, the memory 1208 may include a database storing data and/or processing instructions consistent with this disclosure. According to further embodiments, memory 1208 may correspond, for example, to control memory 198 where a computer 1202 has been implemented as a controller for apparatus 101. Although illustrated as a single one of the memory 1208, two or more memories may be used according to particular desires and/or implementations of the computer 1202 and the described functionality. While memory 1208 is illustrated as an integral component of the computer 1202, in alternative implementations, memory 1208 can be external to the computer 1202.

The application 1210 is an algorithmic software engine providing functionality according to particular desires and/or particular implementations of the computer 1202, particularly with respect to functionality described in this disclosure. For example, application 1210 can serve as one or more components, modules, applications, etc. Further, although illustrated as a single one of application 1210, the application 1210 may be implemented as more than one of the application 1210 on the computer 1202. In addition, although illustrated as integral to the computer 1202, in alternative implementations, the application 1210 can be external to the computer 1202.

There may be any number of the computer 1202 associated with, or external to, a computer system containing computer 1202, each one of the computer 1202 communicating over network 1216. Further, the term "client," "user," and other appropriate terminology may be used interchangeably as appropriate without departing from the scope of this disclosure. Moreover, this disclosure contemplates that many users may use one of the computer 1202, or that one user may use more than one of the computer 1202.

Figure 13:
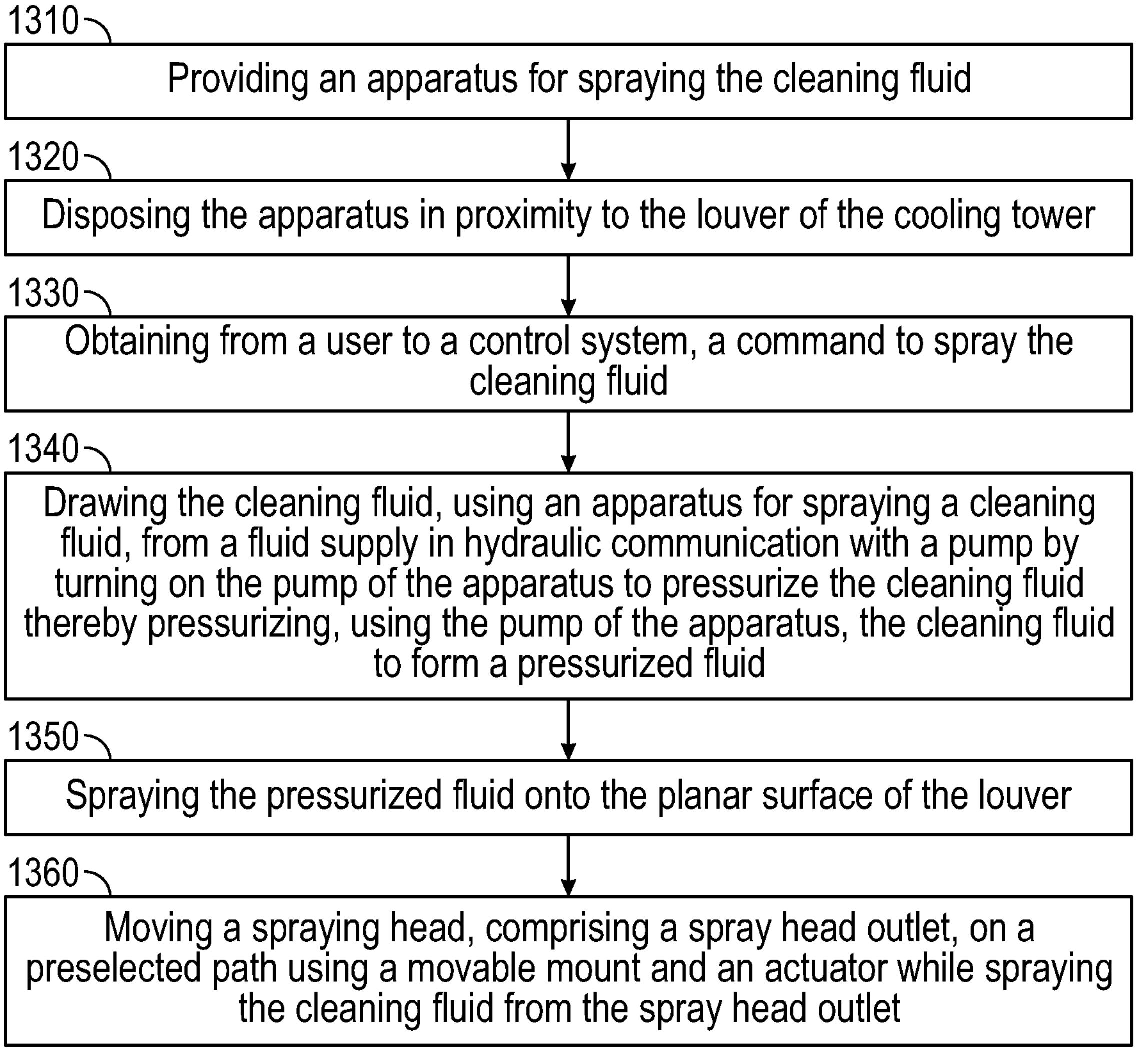
FIG. 13 shows a flowchart in accordance with one or more embodiments.

FIG. 13 illustrates a method (Block 1300) for automatically and continuously controlling and monitoring an apparatus for cooling tower cleaning. Further, one or more steps in FIG. 13 may be performed by one or more components as described in FIGS. 1A-12 (e.g., apparatus 101). While the various steps in FIG. 13 are presented and described sequentially, one of ordinary skill in the art will appreciate that some or all of the steps may be executed in different orders, may be combined or omitted, and some or all of the steps may be executed in parallel. Furthermore, the steps may be performed actively or passively. Users may launch an automated software for operating the apparatus 101. The user may acknowledge various steps of the method by clicking on, in the input interface, text descriptions of the steps.

Referring to FIG. 13, initially apparatus 101 is provided (Block 1310) for spraying the cleaning fluid. An operator or user may then set up the apparatus 101 (Block 1320) by disposing the apparatus 101 in proximity to the louver 104 of the cooling tower 102. The control system may have a feature for integrating motion sensors and cameras and for checking they are functioning correctly and may include an interlock for an occasion when they are not. The user may install motion detection sensors, surveillance cameras, and/or proximity sensors in proximity to the cooling tower 102 and apparatus 101. The control system may therefore require the user to confirm or override the interlock.

Continuing with setting up the apparatus 101, the user may connect the fluid supply 112 to the pump inlet 142 and connect any external power source, such as power supply 194, to the apparatus 101. The user may fill the reservoir 130 at the reservoir inlet 132.

Continuing with setting up the apparatus 101, the user may utilize a cleaning program and may input the program criteria into the control panel 192 of control system 190. The data that the user inputs into the control panel may be the user commands and/or the user inputs. User commands may be, for example, start, stop, and emergency shutdown. The user inputs may comprise the program data to meet the program criteria. Program data may cause the cleaning fluid to be sprayed at preselected portions of the louver at preselected times. The cleaning head 120 may operate through a preset cycle or cycles or it can be operated anytime as needed.

The cleaning program begins by the control system receiving from a user a command to spray the cleaning fluid, i.e., by the user sending a command to actuate the apparatus 101. (Block 2230). The control system may in turn send the command to the apparatus and upon receipt of the command, the pump 140 may turn on (Block 2240). The pump may then draw cleaning fluid 110 from fluid supply 112 and/or from reservoir outlet 134 of reservoir 130. The cleaning fluid 110 is drawn into the pump inlet 142 and through the pump 140 to pressurize the cleaning fluid 110 to form the pressurized fluid 114. Cleaning fluid 110 from fluid supply 112 may flow to the pump inlet 142 through conduit 170. The monitoring subsystem may monitor the pressure of the pressurized fluid 114 at the pump outlet 144 and adjust the pump 140, as necessary. The pressurized fluid 114 flows from the pump outlet 144 to the head inlet 124 of spray head 122.

The method continues by directing the pressurized fluid 114 of the cleaning fluid 110 out of the head outlet 126 of spray head 122 of the cleaning head 120 at the planar surface 106 of the louver 104, e.g., spraying the pressurized fluid 114 onto the planar surface 106 of the louver 104 (Block 1350).

The cleaning program continues by sending a command to the first actuator 154 and/or the second actuator 160 to begin cleaning preselected portions of the louver 104 by traveling along the preselected path of carriage frame 180 (Block 1360). The control system 190, the power supply 194, the processor 196, and the control memory 198 may cooperate with the monitoring subsystem to direct the cleaning head 120 along the preselected cleaning path. The control memory may comprise a set of instructions configured to obtain a command to spray the pressurized fluid 114, turn on the pump 140 to pressurize the cleaning fluid 110 to the preselected pressure, direct the pressurized fluid 114 at the planar surface 106 of the louver 104, and to move the spray head 122 in the cleaning head 120 on a preselected path using the movable mount 136 and the first actuator 154 and/or the second actuator 160. The path may include any one or all of the one orthogonal direction, two orthogonal directions, or three orthogonal directions. The path may include moving the cleaning head 120 using the movable mount 136 along the rail 182, the trolley 184, and/or the third orthogonal direction 187. The movable mount 136 may direct the cleaning head 120 along the path using connector rail 188 to transition between any one or all of the orthogonal directions.

Upon completion of the cleaning program, the cleaning program begins a shutdown sequence. The shutdown sequence may include disengaging the pump and/or returning the cleaning head 120 to a start point and/or to an end point.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. An apparatus for automatically spraying a cleaning fluid onto at least one louver of a cooling tower, the louver having an outwardly facing generally planar surface, the apparatus comprising:

- a spray head comprising a spray head inlet for hydraulic connection of the cleaning fluid, a spray head outlet for directing the cleaning fluid at the planar surface of the louver, and a movable mount for positioning the spray head proximate the planar surface of the louver;
- a carriage frame attached to the cooling tower proximate the louver;

the movable mount being movably mounted on the carriage frame and movable in at least two orthogonal directions along the planar surface of the louver;

a control system for controlling movement of the movable mount on the carriage frame and supply of the cleaning fluid to the spray head so as to cause the cleaning fluid to be sprayed at preselected portions of the louver at preselected times; and a monitoring subsystem coupled to the control system, the monitoring subsystem comprising:

motion sensors configured to detect motion within the louver of the cooling tower and send a motion readiness state to the control system based on the detected motion; and a motion interlock configured to prevent the control system from controlling movement of the movable mount and supply of the cleaning fluid to the spray head based on the motion readiness state.

2. The apparatus of claim 1, wherein the control system comprises:

a control panel configured for user inputs; and a power supply configured to power and to control the movement of the movable mount;

wherein the control panel is configured to move, upon receipt of a command, the spray head on the carriage frame using the movable mount.

3. The apparatus of claim 1, wherein the control system further comprises:

an actuator;

a processor; and a control memory coupled to the processor;

wherein the control memory comprises a set of instructions configured to perform a method comprising:

obtain a command to spray the cleaning fluid;

turn on a pump to pressurize the cleaning fluid to a pressurized fluid at a preselected pressure;

spray the pressurized fluid onto the planar surface of the louver; and move the spray head on a preselected path using the movable mount and the actuator while spraying the cleaning fluid from the spray head outlet.

4. The apparatus of claim 1 further comprising:

a pump;

a reservoir configured to hold the cleaning fluid;

a power supply;

a processor;

a control memory coupled to the processor; and wherein the pump is configured to receive the cleaning fluid from the reservoir, pressurize the cleaning fluid to a pressurized fluid at a preselected pressure, and deliver the pressurized fluid to the spray head;

wherein the control memory comprises a set of instructions configured to perform a method comprising:

obtain a command to spray the pressurized fluid;

turn on the pump to pressurize the cleaning fluid to the preselected pressure;

spray the pressurized fluid onto the planar surface of the louver; and move the spray head on a preselected path using the movable mount.

5. The apparatus of claim 1 further comprising:

an actuator coupled to the apparatus and configured to move the spray head along the carriage frame using the movable mount.

6. The apparatus of claim 5, wherein:

the actuator comprises a rack and pinion drive configured to connect the movable mount to the carriage frame.

7. The apparatus of claim 6, wherein:

the rack and pinion drive can be hydraulically, pneumatically, or electrically operable.

8. The apparatus of claim 1, wherein:

the carriage frame comprises at least one curved connector rail configured to couple one of the at least two orthogonal directions to a third orthogonal direction;

wherein the movable mount is configured to travel along the at least one curved connector rail.

9. A system for automatically spraying a cleaning fluid from a fluid supply onto at least one louver of a cooling tower, the at least one louver having outwardly facing generally a planar surface, the system comprising:

a pump comprising a pump outlet configured to receive the cleaning fluid from the fluid supply into a pump inlet and to pressurize the cleaning fluid to a pressurized fluid at a preselected pressure;

a spray head comprising a spray head outlet configured to direct the cleaning fluid at the planar surface of the louver and comprising a spray head inlet and a movable mount for positioning the spray head proximate the planar surface of the louver;

a conduit coupled to the pump outlet at a conduit first end and coupled to the spray head inlet at a conduit second end and configured to deliver the pressurized fluid from the pump to the spray head;

a carriage frame, comprising a rail, a trolley, and a third orthogonal direction, attached to the cooling tower proximate the louver;

the movable mount being movably mounted on the carriage frame and movable in at least two orthogonal directions along the planar surface of the louver;

an actuator configured to move, using the movable mount, the spray head along the rail, the trolley, and the third orthogonal direction;

a control system comprising:

a control panel configured for user commands;

a power supply configured to power and to control movement of the movable mount;

a processor; and a control memory coupled to the processor, wherein the control memory comprises a set of instructions configured to perform a method comprising:

obtain a command to spray the pressurized fluid;

turn on the pump to pressurize the cleaning fluid to the preselected pressure;

direct the pressurized fluid at the planar surface of the louver; and move the spray head on a preselected path using the movable mount and the actuator; and a monitoring subsystem coupled to the control system, the monitoring subsystem comprising:

motion sensors configured to detect motion within the louver of the cooling tower and send a motion readiness state to the control system based on the detected motion; and a motion interlock configured to prevent the control system from controlling movement of the movable mount and supply of the cleaning fluid to the spray head based on the motion readiness state.

* * * * *